(12) United States Patent
Wiegand et al.

(10) Patent No.: US 8,934,542 B2
(45) Date of Patent: Jan. 13, 2015

(54) SCALABLE VIDEO CODING SUPPORTING PIXEL VALUE REFINEMENT SCALABILITY

(75) Inventors: Thomas Wiegand, Berlin (DE); Martin Winken, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 898 days.

(21) Appl. No.: 12/665,293

(22) PCT Filed: Jun. 29, 2007

(86) PCT No.: PCT/EP2007/005808
§ 371 (c)(1),
(2), (4) Date: Jun. 9, 2010

(87) PCT Pub. No.: WO2009/003499
PCT Pub. Date: Jan. 8, 2009

(65) Prior Publication Data
US 2010/0260260 A1    Oct. 14, 2010

(51) Int. Cl.
| | | |
|---|---|---|
| H04N 7/12 | (2006.01) | |
| H04N 11/02 | (2006.01) | |
| H04N 11/04 | (2006.01) | |
| H04N 19/59 | (2014.01) | |
| H04N 19/61 | (2014.01) | |
| H04N 19/33 | (2014.01) | |
| H04N 19/30 | (2014.01) | |

(52) U.S. Cl.
CPC ... *H04N 19/00757* (2013.01); *H04N 19/00781* (2013.01); *H04N 19/00436* (2013.01); *H04N 19/00424* (2013.01)
USPC .............. 375/240.12; 375/240.14; 375/240.24

(58) Field of Classification Search
None
See application file for complete search history.

(56) References Cited

U.S. PATENT DOCUMENTS

| | | | |
|---|---|---|---|
| 8,014,445 B2 | 9/2011 | Segall | |
| 2002/0037048 A1* | 3/2002 | Van Der Schaar et al. | 375/240.12 |
| 2002/0126759 A1* | 9/2002 | Peng et al. | 375/240.16 |
| 2003/0086622 A1* | 5/2003 | Klein Gunnewiek et al. | 382/240 |
| 2005/0195896 A1* | 9/2005 | Huang et al. | 375/240.03 |

(Continued)

FOREIGN PATENT DOCUMENTS

| | | |
|---|---|---|
| JP | 2007-243942 | 9/2007 |
| JP | 2010-512699 | 4/2010 |

OTHER PUBLICATIONS

ITU-T Rec. H.264 & ISO/IEC 14496-10 AVC, "Advanced Video Coding for Generic Audiovisual Services"; Mar. 2005.

(Continued)

*Primary Examiner* — Joseph Ustaris
*Assistant Examiner* — Kevin McInnish
(74) *Attorney, Agent, or Firm* — Michael A. Glenn; Perkins Coie LLP

(57) ABSTRACT

A more efficient way of enabling scalability in terms of pixel value resolution is achieved by temporally predicting a first and a second representation of a video material separately to each other with the first representation being of a lower pixel value resolution than the second representation, with mapping the first prediction residual or a reconstructed version thereof from the first pixel value resolution to the second pixel value resolution dependent on the second prediction signal obtained from temporally predicting the second representation, and by coding a second prediction residual being of the second pixel value resolution as representing a deviation between a combination of the second and third prediction signals and the second representation.

26 Claims, 7 Drawing Sheets

(56) References Cited

U.S. PATENT DOCUMENTS

| | | |
|---|---|---|
| 2005/0259729 A1 | 11/2005 | Sun |
| 2007/0217502 A1* | 9/2007 | Ammar et al. ............. 375/240.1 |
| 2010/0008418 A1 | 1/2010 | Wu |
| 2010/0208143 A1* | 8/2010 | Banterle et al. ............... 348/678 |
| 2010/0215103 A1* | 8/2010 | Yin et al. ................. 375/240.16 |
| 2010/0220789 A1* | 9/2010 | Yuwen et al. ............ 375/240.16 |
| 2012/0201301 A1* | 8/2012 | Bao et al. ................. 375/240.14 |

OTHER PUBLICATIONS

T. Wiegand, G.J. Sullivan, J. Reichel, H. Schwarz, and M. Wien, eds.;"Joint Draft 10 of SVC Amendment"; Joint Video Team, Doc. JVT-W201, pp. 1-267, San Jose, CA, USA, Apr. 2007.

T. Wiegand, G.J. Sullivan, J. Reichel, H. Schwarz, and M. Wien, eds.;"Joint Draft 10 of SVC Amendment"; Joint Video Team, Doc. JVT-W201, pp. 268-550, San Jose, CA, USA, Apr. 2007.

J. Reichel, H. Schwarz, and M. Wien, eds., "Proposed modifications for Joint Scalable Video Model"; Apr. 2007, Joint Video Team, Doc. JVT-W202, pp. 268-550, San Jose, CA, USA.

ISO/IEC 14496-2:2001(E), "Information technology—Coding of audio-visual objects—Part 2: Visual"; Jul. 2001; pp. 1-250, Sydney.

ISO/IEC 14496-2:2001(E), "Information technology—Coding of audio-visual objects—Part 2: Visual"; Jul. 2001; pp. 251-520, Sydney.

Winken M. et al: "Bit-depth Scalability in SVC", Video Standards and Drafts, JVT-V078, Jan. 14, 2007, XP030006886.

Erdem A. et al: "Compression of 10-bit video using the tools of MPEG-2" Signal Processing. Image Communication, Elsevier Science Publishers, Amsterdam, NL, vol. 7, No. 1, Mar. 1995, pp. 27-56, XP004047120,ISSN: 0923-5965,abstract,Chapters 1-2.

Schwarz H. et al: "SVC Core Experiment 2.1: Inter-layer prediction of motion and residual data", ISO/IEC JTC1/SC29/WG11 M11043, Jul. 2004, pp. 1-6, XP002360488.

Gao, et al., "Applications and Requirement for Color Bit Depth Scalability", JVT of ISO/IEC MPEG & ITU-T VCEG (ISO/IEC JTC1/SC29/WG11 and ITU-T SG16 Q.6) Document JVT-U049, ITU-T 21st meeting, Hangzhou, China, Oct. 2006, 10 pages.

Gao, et al., "Bit Depth Scalability", JVT of ISO/IEC MPEG & ITU-T VCEG (ISO/IEC JTC1/SC29/WG11 and ITU-T SG16 Q.6) Document: JVT-V061-ITU-T 22nd meeting, Marrakech, Morocco, Jan. 2007, 14 pages.

Segall, et al., "SVC-to-AVC Bit-stream Rewriting for Coarse Grain Scalability", JVT of ISO/IEC MPEG & ITU-T VCEG (ISO/IEC JTCQ/SC29/WG11 and ITU-T SG16 Q.16) Document JVT-T061, ITU-T 20th meeting, Kagenfurt, Austria, Jul. 2006, 8 pages.

Segall, et al., "System for Bit-Depth Scalable Coding", JVT of ISO/IEC MPEG & ITU-T VCEG (ISO/IEC JTC1/SC29/WG11 and ITU-T SG16 Q.6) Document: JVT-W113, ITU-T 23rd meeting, San Jose, California, Apr. 2007, 7 pages.

Segall, et al., "Tone Mapping SEI Message", JVT of ISO/IEC MPEG & ITU-T VCEG (ISO/IEC JTC1/S29/WG11 and ITU-T SG16 Q.6) Document: JVT-S087 19th meeting, Geneva, Switzerland, Apr. 2006, 12 pages.

* cited by examiner

SCALABLE VIDEO CODING SUPPORTING PIXEL VALUE REFINEMENT SCALABILITY

CROSS-REFERENCE TO RELATED APPLICATIONS

This application is a national phase entry of PCT Patent Application No. PCT/EP2007/005808, filed 29 Jun. 2007, and is incorporated herein in its entirety by reference

BACKGROUND OF THE INVENTION

The present invention is concerned with scalable video coding and, in particular, with scalable video coding supporting pixel value refinement scalability.

A current project of the Joint Video Team (JVT) of the ISO/IEC Moving Pictures Experts Group (MPEG) and the ITU-T Video Coding Experts Group (VCEG) is the development of a scalable extension of the state-of-the-art video coding standard H.264/MPEG4-AVC defined in T. Wiegand, G. J. Sullivan, J. Reichel, H. Schwarz and M. Wien, eds., "Joint Draft 10 of SVC Amendment", Joint Video Team, Doc. JVT-W201, San Jose, Calif., USA, April 2007 and J. Reichel, H. Schwarz, and M. Wien, eds., "Joint Scalable Video Model JSVM-10", Joint Video Team, Doc. JVT-W202, San Jose, Calif., USA, April 2007, supports temporal, spatial and SNR scalable coding of video sequences or any combination thereof.

H.264/MPEG4-AVC as described in ITU-T Rec. & ISO/IEC 14496-10 AVC, "Advanced Video Coding for Generic Audiovisual Services," version 3, 2005, specifies a hybrid video codec in which macroblock prediction signals are either generated in the temporal domain by motion-compensated prediction, or in the spatial domain by intra prediction, and both predictions are followed by residual coding. H.264/MPEG4-AVC coding without the scalability extension is referred to as single-layer H.264/MPEG4-AVC coding. Rate-distortion performance comparable to single-layer H.264/MPEG4-AVC means that the same visual reproduction quality is typically achieved at 10% bit-rate. Given the above, scalability is considered as a functionality for removal of parts of the bit-stream while achieving an R-D performance at any supported spatial, temporal or SNR resolution that is comparable to single-layer H.264/MPEG4-AVC coding at that particular resolution.

The basic design of the scalable video coding (SVC) can be classified as a layered video codec. In each layer, the basic concepts of motion-compensated prediction and intra prediction are employed as in H.264/MPEG4-AVC. However, additional inter-layer prediction mechanisms have been integrated in order to exploit the redundancy between several spatial or SNR layers. SNR scalability is basically achieved by residual quantization, while for spatial scalability, a combination of motion-compensated prediction and oversampled pyramid decomposition is employed. The temporal scalability approach of H.264/MPEG4-AVC is maintained.

In general, the coder structure depends on the scalability space that is necessitated by an application. For illustration, FIG. 7 shows a typical coder structure 900 with two spatial layers 902a, 902b. In each layer, an independent hierarchical motion-compensated prediction structure 904a,b with layer-specific motion parameters 906a, b is employed. The redundancy between consecutive layers 902a,b is exploited by inter-layer prediction concepts 908 that include prediction mechanisms for motion parameters 906a,b as well as texture data 910a,b. A base representation 912a,b of the input pictures 914a,b of each layer 902a,b is obtained by transform coding 916a,b similar to that of H.264/MPEG4-AVC, the corresponding NAL units (NAL—Network Abstraction Layer) contain motion information and texture data; the NAL units of the base representation of the lowest layer, i.e. 912a, are compatible with single-layer H.264/MPEG4-AVC. The reconstruction quality of the base representations can be improved by an additional coding 918a,b of so-called progressive refinement slices; the corresponding NAL units can be arbitrarily truncated in order to support fine granular quality scalability (FGS) or flexible bit-rate adaptation.

The resulting bit-streams output by the base layer coding 916a,b and the progressive SNR refinement texture coding 918a,b of the respective layers 902a,b, respectively, are multiplexed by a multiplexer 920 in order to result in the scalable bit-stream 922. This bit-stream 922 is scalable in time, space and SNR quality.

Summarizing, in accordance with the above scalable extension of the Video Coding Standard H.264/MPEG4-AVC, the temporal scalability is provided by using a hierarchical prediction structure. For this hierarchical prediction structure, the one of single-layer H.264/MPEG4-AVC standards may be used without any changes. For spatial and SNR scalability, additional tools have to be added to the single-layer H.264/MPEG4.AVC. All three scalability types can be combined in order to generate a bit-stream that supports a large degree on combined scalability.

Certain applications may benefit from enhancement layers, which allow extracting and displaying higher bit-depth and, possibly, higher spatial resolution content on top of a base layer with low bit-depth or, in more general terms, lower pixel value resolution, and, possibly, lower spatial resolution. In the above-mentioned version of the scalable extension, however, scalability tools are only specified for the case that both the base layer and the enhancement layer represent a given video source with the same bit-depth/pixel value resolution of the corresponding arrays of luma and chroma samples.

Thus, it would be advantageous to provide a scalable video scheme that supports scalability in terms of pixel value resolution. It would be further advantageous if this video coding scheme would support a broad spectrum of possible pixel value resolution mappings between different levels of pixel value resolutions. Moreover, it would be favorable if the video coding scheme would keep the computation overhead on the decoder side low. Using one of the above-mentioned video coding techniques, providing scalability in terms of pixel value resolution would necessitate the incorporation of two separate, totally self-contained video bit-streams coded based on different pixel value resolutions into one common scalable data-stream. However, this results in a bad compression ratio.

SUMMARY

According to an embodiment, a video encoder may have: first predictor for temporally predicting a first representation of a video material to obtain a first prediction signal, and coding a first prediction residual representing a deviation between the first prediction signal and the first representation, the first representation, the first prediction signal and the first prediction residual being of a first pixel value resolution; and second predictor for temporally predicting a second representation of the video material to obtain a second prediction signal, the second representation and the second prediction signal being of a second pixel value resolution being higher than the first pixel value resolution, wherein the second predictor is configured to map the first prediction residual or a reconstructed version of the first prediction residual from the first pixel value resolution to the second pixel value resolution dependent on the second prediction signal to obtain a third prediction signal and code a second prediction residual being of the second pixel value resolution and representing a deviation between a combination of the second and third prediction signals and the second representation.

According to another embodiment, a video decoder for decoding a scalable video signal representing a video material with a first and a second pixel value resolution with the second pixel value resolution being higher than the first pixel value resolution, the scalable video signal having coded therein a first prediction residual of the first pixel value resolution and a second prediction residual of the second pixel value resolution, may have: a decoder for reconstructing the first and second prediction residuals from the scalable video signal; a predictor for temporally predicting the second representation of the video material to obtain a second prediction signal, the second representation and the second prediction signal being of the second pixel value resolution, wherein the predictor for temporally predicting is configured to map the first prediction residual from the first pixel value resolution to the second pixel value resolution dependent on the second prediction signal to obtain a third prediction signal; and a reconstructor for reconstructing the second representation based on the second prediction signal, the third prediction signal and the second prediction residual.

According to another embodiment a method for encoding a video may have the steps of: temporally predicting a first representation of a video material to obtain a first prediction signal, and coding a first prediction residual representing a deviation between the first prediction signal and the first representation, the first representation, the first prediction signal and the first prediction residual being of a first pixel value resolution; and temporally predicting a second representation of the video material to obtain a second prediction signal, the second representation and the second prediction signal being of a second pixel value resolution being higher than the first pixel value resolution, wherein the temporally predicting involves mapping the first prediction residual or a reconstructed version of the first prediction residual from the first pixel value resolution to the second pixel value resolution dependent on the second prediction signal to obtain a third prediction signal and coding a second prediction residual being of the second pixel value resolution and representing a deviation between a combination of the second and third prediction signals and the second representation.

According to another embodiment, a method for decoding a scalable video signal representing a video material with a first and a second pixel value resolution with the second pixel value resolution being higher than the first pixel value resolution, the scalable video signal having coded therein a first prediction residual of the first pixel value resolution and a second prediction residual of the second pixel value resolution, may have the steps of: reconstructing the first and second prediction residuals from the scalable video signal; temporally predicting the second representation of the video material to obtain a second prediction signal, the second representation and the second prediction signal being of the second pixel value resolution, wherein the temporally predicting involves mapping the first prediction residual from the first pixel value resolution to the second pixel value resolution dependent on the second prediction signal to obtain a third prediction signal; and reconstructing the second representation based on the second prediction signal, the third prediction signal and the second prediction residual.

Another embodiment may have a computer program having instructions for performing, when running on a computer, an inventive method.

Another embodiment may have a scalable video bit-stream representing a video material with a first and a second pixel value resolution with the second pixel value resolution being higher than the first pixel value resolution, the scalable video bit-stream having coded therein a first prediction residual of the first pixel value resolution and a second prediction residual of the second pixel value resolution, and the scalable video bit-stream being decodable by reconstructing the first and second prediction residuals from the scalable video signal; temporally predicting the second representation of the video material to obtain a second prediction signal, the second representation and the second prediction signal being of the second pixel value resolution, wherein the temporally predicting involves mapping the first prediction residual from the first pixel value resolution to the second pixel value resolution dependent on the second prediction signal to obtain a third prediction signal; and reconstructing the second representation based on the second prediction signal, the third prediction signal and the second prediction residual.

The present invention is based on the finding that a more efficient way of enabling scalability in terms of pixel value resolution may be achieved by temporally predicting a first and a second representation of a video material separately to each other with the first representation being of a lower pixel value resolution than the second representation, where mapping the first prediction residual or a reconstructed version thereof from the first pixel value resolution to the second pixel value resolution dependent on the second prediction signal obtained from temporally predicting the second representation, and by coding a second prediction residual being of the second pixel value resolution as representing a deviation between a combination of the second and third prediction signals and the second representation. By use of the second prediction signal in order to map the first prediction residual or the reconstructed version thereof from the first pixel value resolution to the second pixel value resolution, individually mapping the first prediction residual or the reconstructed version thereof may be performed accurately independent of the first prediction signal even if a non-linear mapping scheme is used. By this measure, the inter-layer prediction remains accurate and concurrently, the decoder does not need to temporally predict the first representation involving, for example, a relatively complex motion compensation. This, in turn, results in low complexity at the decoder at a relatively high rate-distortion performance. Moreover, the scalable coding scheme itself does not restrict the mapping scheme used to map between the prediction value resolutions, to be linear.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
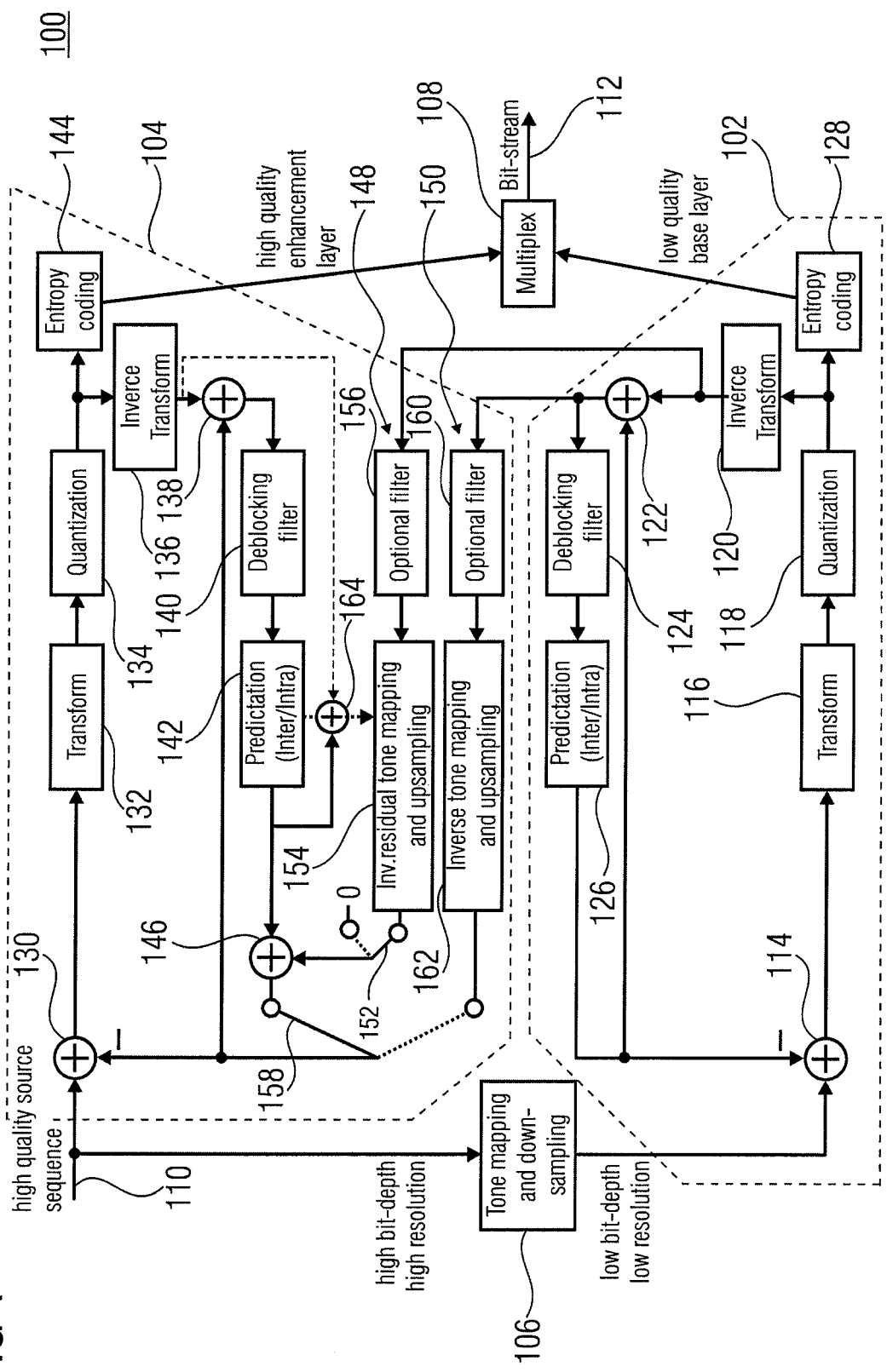
FIG. 1 is a block diagram of a video encoder according to an embodiment of the present invention.

FIG. 1 shows a video encoder 100 comprising a base layer encoding module 102, a high quality encoding module 104, a quality reduction module 106 and a multiplexer 108. The video encoder 100 of FIG. 1 comprises an input 110 for receiving a high quality source video signal and an output 112 for outputting a scalable video bit-stream. The video encoder 100 is operative to encode the high quality source video signal 110 into the scalable video bit-stream 112 such that a first part of the scalable video bit-stream at the output 112, in the following called the low quality base layer, is self-contained in that this part enables a reconstruction of the video content of the high quality source video signal at the input 110 with a quality being lower than the initial quality of the signal at the input 110, i.e. at the low quality, without knowledge or use of the remaining part of the scalable video bit-stream at the output 112. The remaining part, in the following called the high quality enhancement layer, in turn, enables a reconstruction of the high quality source video signal at the input 112 with a higher quality than the low quality by combining both parts, the low quality base layer and the high quality enhancement layer.

As will be described in more detail below, the quality difference between the high quality enhancement layer on the one hand and the low quality base layer on the other hand relates, at least, to the pixel value resolution, such as the bit-depth of the pixel values, such as the luma and/or chroma values. Although the following description focuses on the bit-depth difference between high quality enhancement layer and the low quality base layer as an example for a pixel value refinement difference, other examples for pixel value resolution differences are also possible. For example, the pixel value resolution of the high quality enhancement layer being higher than the pixel value resolution of the low quality base layer may be the result of a higher number of color parameters per pixel in the high quality enhancement layer relative to the low quality base layer, with the bit-depth being the same. For example, the low quality base layer may represent the video content by use of only three 8-bit values, whereas the high quality enhancement layer may use four 8-bit values. However, in order to ease the understanding of the following description, the following description focuses on the bit-depth difference as an example for the pixel value resolution difference.

As already mentioned above, the scalable bit-stream at the output 112 is composed of a high quality enhancement layer on the one hand and a low quality base layer on the other hand. The high quality enhancement layer signal is output by the high quality encoding module 104, whereas the low quality encoding module 102 outputs the low quality base layer signal. The multiplexer 108 receives both signals and multiplexes them into the scalable bit-stream 112. For example, the multiplexer 108 multiplexes both signals into the scalable bit-stream 112 such that the low quality base layer precedes the high quality enhancement layer. The high quality encoding module 104 is connected between the input 110 of the video encoder 100 and a first input of multiplexer 108. In case of the low quality encoding module 102, the quality reduction module 106 is connected between the input 110 and an input of the low quality encoding module 102 in order to reduce the pixel value resolution of the source video signal before same enters the low quality encoding module 102. As will also be described in more detail below, the quality reduction performed on module 106 may involve, besides the reduction in the pixel value resolution, other quality reductions. As described in the following, the pixel value resolution reduction may be achieved by a reduction in bit-depth. Further, the quality reduction may further comprise a reduction in spatial resolution. In particular, the following description exemplarily relates to an embodiment where the low quality differs from the high quality in both the pixel value resolution as well as the spatial resolution.

The base quality encoding module 102 is connected between the output of the quality reduction module 106 and another input of multiplexer 108. An output of multiplexer 108, in turn, is connected to output 112 of video encoder 100.

Being connected in this way, the high quality encoding module 104 is for encoding the high quality source video signal directly, whereas the low quality encoding module 102 encodes the low quality version of the video source signal as output by quality reduction module 106. As will be described in more detail below, both encoding modules 102 and 104 operate in parallel to each other in that both encoding modules 102 and 104 individually perform a temporal prediction on its respective input signal. According to following embodiments of modules 102 and 104, both modules comprise their own motion-compensated prediction loop, in particular, a closed loop, so as to encode merely the prediction residual into the respective output signal, i.e. the high quality enhancement layer in case of module 104 and the low quality base layer in case of module 102. However, as will also be described in more detail below, the high quality encoding module 104 additionally uses the prediction residual or a reconstructed version thereof of the low quality encoding module 102 in order to refine—at least partially, i.e. at least for some blocks of the video material—the prediction signal of its own high quality temporal prediction loop. By using only the prediction residual of the low quality base layer in order to refine the prediction within the high quality encoding module 104, the decoding of the scalable bit-stream at the output 112 in order to derive the high quality is possible by the performance of only one temporal prediction. As will be described in more detail below, the use of only the prediction residual of the low quality base layer does not necessitate the tone mapping between the high bit-depth of the high quality layer to the low quality layer to be linear. Rather, the prediction signal of the high quality enhancement layer prediction loop is used in order to correct for non-linearities.

Internally, the base quality encoding module 102 comprises a subtractor 114, a transform module 116, a quantization module 118, an inverse transform module 120, an adder 122, a de-blocking filter 124, a prediction module 126, and en entropy coding module 128. The subtractor 114, transform module 116, quantization module 118, inverse transform module 120, adder 122, de-blocking filter 124, and prediction module 126 form a closed prediction loop, i.e. they are connected in the order mentioned into a closed loop. In particular, the non-inverting input of subtractor 114 forms the input of the low quality encoding module 102, wherein the inverting input of subtractor 114 is connected to the output of prediction module 126. The output of the prediction module 126 is also connected to a first input of adder 122, wherein the other input of adder 122 is connected to the output of the inverse transform module 120. An input of the inverse transform module 120 is connected to the output of quantization module 118 which, in turn, is also connected to an input of entropy coding module 128. An output of the entropy coding module 128 concurrently forms the output of the low quality encoding module 102.

Similarly, high quality encoding module 104 comprises a subtractor 130, a transform module 132, a quantization module 134, an inverse transform module 136, an adder 138, a de-blocking filter 140, a prediction module 142, and an entropy coding module 144. Elements 130 to 144 are connected to each other in a similar way as compared to elements 114 to 128 of low quality encoding module 102. That is, elements 130 to 142 are connected into a closed loop, with the non-inverting input of subtractor 130 forming the input of high quality encoding module 104, the output of the quantization module 134 being connected to the input of the inverse transform module 136 as well as the input of entropy coding module 144 and the output of prediction module 142 being—in the present case, exemplarily, in an indirect manner—coupled to the inverting input of subtractor 130 as well as a further input of adder 138. However, in addition to these elements, the high quality encoding module 104 comprises a further adder 146 as well as two inter-layer prediction paths 148 and 150. The inter-layer prediction path 148 is connected between the output of inverse transform module 120 of low quality encoding module 102 on the one hand and an input of adder 146 on the other hand, with a switch 152 being connected into path 148 in order to enable a connection and disconnection of path 148 to/from the input of adder 146. In particular, switch 152 is configured to either apply a zero to the input of adder 146 or connect the path 148 with the input of adder 146. Path 148 represents a low quality prediction residual path for providing the low quality prediction residual from module 102 to module 104 and has connected thereinto, an inverse mapping and upsampling module 154 and an optional filter 156, the optional filter 156 being connected between the inverse mapping and upsampling module 154 and the inverse transform module 120.

Similarly, path 150 represents a base quality reconstruction signal provision path extending from an output of adder 122 of low quality encoding module 102 on the one hand and a switch 158 on the other hand, Switch 158 enables the inverting input of subtractor 130 and the further input of adder 138 to be either connected to the output of adder 146 or the other end of path 150. In a similar way than path 148, path 150 has an optional filter 160 and an inverse mapping and upsampling module 162 connected thereinto, in the order mentioned.

In contrast to the inverse mapping and upsampling module 162, the inverse mapping and upsampling module 154 connected into the residual path 148 comprises a further input for receiving the prediction signal output by prediction module 142 or, alternatively, a sum of the prediction signal output by prediction module 142 and the output of inverse transform module 136, i.e. the reconstructed residual signal of the high quality encoding module 104. Thus, the further input of the inverse mapping and upsampling module 154 is either connected to the output of prediction module 142 directly or to an output of a further adder 164, the inputs of which are connected to the output of prediction module 142 and the output of inverse transform module 136, respectively. As will become clear from FIG. 6, a switch may be connected between adder 164 and the output of inverse transform module 136 in order to apply to the input of adder 168 either a zero or the signal output by inverse transform module 136 to, alternatively, allow for a switching between both possibilities.

After having described the internal structure of the video encoder 100 in detail, its general mode of operation is described in more detail below. In particular, in the following, the mode of operation is preliminarily described for the exemplarily case that switches 152 and 158 assume the positions shown in FIG. 1, i.e. connect the residual path 148 with the input of adder 146 and connect the output of adder 146 with the inverting input of subtractor 130, thereby disconnecting the base layer reconstruction path 150 from the inverting input of subtractor 130. In accordance with this assumption, a further embodiment of the present invention provides that the switches 158 and 152 may be removed with the connections between elements 130, 146, 154 and 162 being as shown by the continuous lines of the switches 152, 158.

As already described above, each of modules 102 and 104 performs a temporal prediction on the respective input signal. For example, in the low quality encoding module 102, subtractor 114 subtracts the low quality prediction signal output by prediction module 126 from the low quality version of the source video signal received at the input of module 102. As a result, subtractor 114 outputs a low quality residual. The transform module 116 performs a transformation on the low quality residual signal. The transformation may involve a spatial decomposition, such as a DCT, FFT or a wavelet transform. The transformed signal is quantized by quantization module 118. The quantization module 118 may be left away. For example, the transformation performed by transform module 116 may inherently result in integer transform coefficients. The transform performed by the transform module 116 is, for example, a block-wise transformation and the transform residual signal represents a spatial representation of the low quality residual signal output by subtractor 114. By this measure, the combination of the transform module 116 and the quantization module 118 encode the residual signal output by subtractor 114 in a transform-based manner, lossy or non-lossy. The quantized transformed residual signal is entropy-coded by entropy coding module 128, thus resulting in the low quality base layer part, which is multiplexed into the scalable bit-stream by multiplexer 108.

The inverse transform module 120 reconstructs the low quality residual signal from the output of quantization module 118 by use of an inverse transformation, i.e. a transformation being an inverse to the transformation of transform module 116. Thus, the output of inverse transform module 120 represents a reconstructed version of the low quality residual signal. This residual signal is led to the high quality encoding module 104 via path 148, as described below. However, the reconstructed version is also used by adder 122 in order to obtain a reconstructed version of the low quality video signal received at the input of low quality encoding module 102. In particular, adder 122 adds the reconstructed residual signal with the output of prediction module 126, i.e. the low quality prediction signal. The reconstructed version of the low quality video signal thus obtained is filtered by the de-blocking filter 124, which is optional, in order to remove artifacts, and thus forwarded to the prediction module 126. The prediction module 126 performs a temporal prediction on the thus de-blocked reconstructed version of the low quality input signal, the temporal prediction involving, for example, a motion-compensation. The prediction module 126 computes, by this measure, the low quality prediction signal and outputs same to the inverting input of subtractor 114 and the further input of adder 122.

As already mentioned above, the high quality encoding module 104 substantially operates similar to low quality encoding module 102. That is, the high quality source video signal is received by subtractor 130, which subtracts the prediction signal output by prediction module 142 from this signal along with the signal derived from the residual path 148. Thereby, subtractor 130 outputs a high quality prediction residual which is transformed by transformation module 132 and quantized by quantization module 134, as described in connection with elements 116 and 118 of module 102 above. The entropy coding module 144 entropy-codes the quantized transformed prediction residual in order to obtain the high quality enhancement layer part multiplexed into the scalable bit-stream by multiplexer 108.

The inverse transform module 136 reconstructs from the quantized transformed prediction residual a reconstructed version of the prediction residual output by subtractor 130 and outputs same to adder 138. Adder 138 adds to this reconstructed version of the high quality prediction signal, the combined prediction signal input to the inverter input of subtractor 130 to obtain the reconstructed version of the high quality source video signal as input into high quality encoding module 104. Similar to elements 126 and 124, the de-blocking filter 140 performs a de-blocking filtering on the reconstructed high quality video signal with the prediction module 142 performing a temporal prediction on the resulting output of the de-blocking filter 140. Again, the de-blocking filter is optional and may be removed from module 104. The output of prediction module 142 represents the high quality prediction signal. At the adder 146, this high quality prediction signal is further refined by a prediction gained from the prediction residual of the low quality encoding module 102 by, way of path 148, as described in the following. The output of adder 146 provides the combined prediction signal to the inverted input of subtractor 130 and the further input of adder 138.

In order to be able to use the reconstructed low quality prediction residual signal as output by inverse transform module 120, within path 148, the low quality level of this low quality prediction residual signal is transferred to the high quality level. That is, the lower pixel value resolution of the low quality layer is adapted to the pixel value resolution of the high quality layer. Further, in accordance with the embodiment of FIG. 1, also the spatial resolution is increased to comply with the spatial resolution of the high quality layer. Accordingly, after some optional filtering by optional filter 146, such as a artifact reduction filtering, the low quality prediction residual signal is subjected to an inverse tone mapping and an upsampling process in order to reverse the tone mapping and downsampling performed in quality reduction module 106. Upon this quality adaption, a quality-adapted prediction residual signal is applied to adder 146. Thus, the sum of the prediction signal as output by prediction module 142 and the quality-adapted prediction residual signal results in a refined prediction of the high quality source video signal as originally input into high quality encoding module 104, so that a smaller high quality prediction residual signal may be coded by means of elements 132, 134 and 144. This, in turn, results in a better rate-distortion performance of the scalable bit-stream 112.

Before describing the inverse tone mapping and upsampling within module 155 in more detail, a short description of the mode of operation of high quality encoding module 104 in case of the other switch position of switches 158 and 152 is described, with these positions being indicated with dotted lines. As can be seen, in this inter-layer mode, the quality-adapted prediction residual from the low quality layer is not used. Instead, a zero is applied to the further input of adder 146. Further, switch 158 connects path 150 with the inverting input of subtractor 130. By this measure, a quality-adapted version of the reconstructed low quality video signal is applied as a prediction signal to the inverting input of subtractor 130. Similar to path 148, the optional filter 160 optionally filters the low quality reconstructed signal, while the inverse mapping and upsampling module 162 inversely maps the pixel values and upsamples the optionally filtered reconstructed low quality video signal.

As became clear from the above description, paths 148 and 150 operate in a similar way. The differences in the operation of modules 154 and 162 are described in the following. To this end, the following description assumes that the high quality encoding module 104 is able to block-wise switch between several switching modes of switches 152 and 158, among which the two modes just described are. To be more precise, reference is made to FIG. 2, which shows a portion of a video material 200. As can be seen, the video material comprises a sequence of pictures 202. Each picture is commonly divided into a plurality of blocks 204. In particular, in FIG. 2, each picture 202 is shown to be structured into an array of 4×3 blocks 204. However, it is noted that the block-wise structuring exemplified in FIG. 2 merely serves as an example in that other block-wise sub-divisions are also possible.

The blocks 204 shall indicate the units in which the low quality encoding module 102 may switch between intra and inter prediction. In particular, blocks 204 may correspond to the macroblock used in, for example, the low quality encoding module 102 to decide which of these macroblocks is to be temporally predicted by prediction module 126 and which is to be coded without temporary prediction. However, the blocks 204 may either correspond to block sizes other than macroblock size.

It is noted that the effective macroblock sizes of the low quality encoding module 102 and the high quality encoding module 104 may differ from each other due to the exemplary spatial resolution difference between both layers. To be more precise, while the macroblock size may be set to 16×16 samples in both the high quality encoding module 104 and the low quality encoding module 102, the macroblocks of the high quality encoding model 104 may assume a smaller portion of the respective picture than macroblocks of the low quality encoding module 102 due to the exemplary spatial resolution difference. Further, it is noted that it is possible that the macroblock borders of the low quality layer coincide with the macroblock borders of the high quality layer, but the opposite may also be true, depending on the spatial resolution ratio between the high quality layer and the low quality layer.

Figure 2:
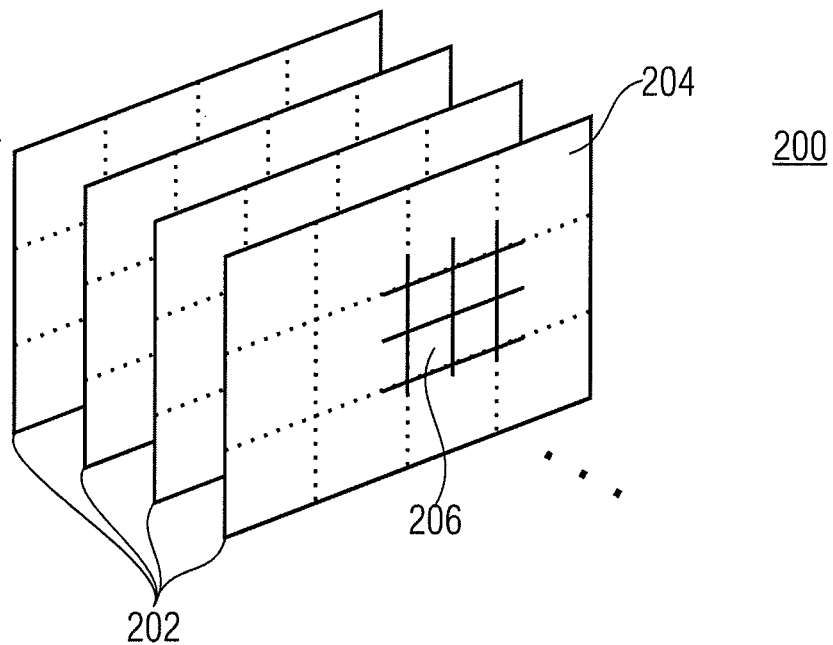
FIG. 2 is a schematic illustrating a video material being composed of a plurality of blocks according to an embodiment of the present invention.

Further, FIG. 2 shows an example of the subdivision of the pictures 202 into blocks 206 within a small region of the first picture. Blocks 206 shall indicate the units at which the high quality encoding means is able to switch between the various inter-layer prediction modes. Blocks 205 may correspond to the macroblocks used in, for example, the high quality encoding module 102 to decide which of these macroblocks are to be temporally predicted by prediction module 142 and which is to be coded without temporally prediction. For example, FIG. 2 may show the case where blocks 204 and blocks 206 are of macroblock size, respectively. In this case, the FIG. 2 would show the exemplary case of the spatial resolution of the high quality layer being twice the spatial resolution of the low quality layer provided the macroblock size in terms of samples is the same within modules 102 and 104. As can be seen, each block 204 is further sub-divided into four sub-blocks 206. Assuming that the sub-division into blocks 204 indicates the ability of the low quality encoding module 102 to switch between inter and intra prediction, and that the sub-division into blocks 206 indicates the ability of the high quality encoding module 104 to steer switches 152 and 158, it turns out from the following description that the high quality encoding module 104 is configured to control the switches 152 and 158 depending on the intra/inter prediction decision of the low quality encoding module 102 which is done in units of blocks 204. Thereby, for those blocks 206 that overlay a block 204 having been inter-predicted or temporary predicted by low quality encoding module 102, path 148 is avoided and path 150 is used instead, or none of paths 148 and 150. Within all other blocks 206, the high quality encoding module 104 is free to, and exemplarily fixedly uses, the residual path 148 for inter-layer prediction. As will become clear from the following description, by this measure, merely one temporal prediction is necessitated at the decoder side at the maximum for each portion of the pictures of the video material even when decoding the higher quality layer.

As it has turned out from the above description, both modules 154 and 162 perform inverse tone mapping. However, as became clear from the above description, the input signal input into module 162 represents a reconstruction of the low quality video signal itself. In contrast thereto, the input signal input into module 154 merely represents a reconstructed version of the low quality prediction residual. If modules 154 and 162 were exactly the same, this could cause a deterioration of the prediction refinement provided by the low quality prediction signal path 148 in case of a non-linear tone mapping being used.

Figure 3:
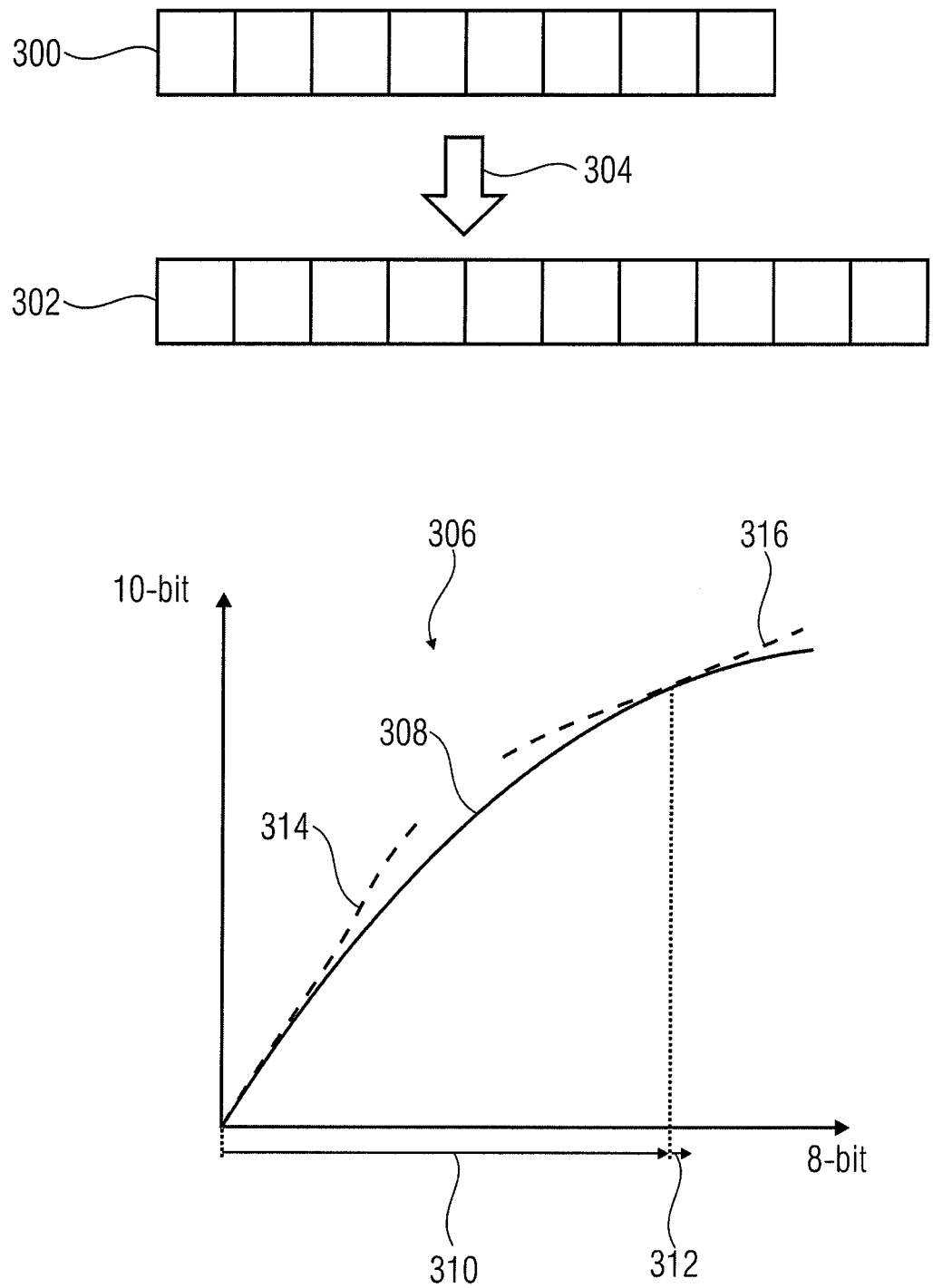
FIG. 3 is a schematic illustrating the inverse tone mapping in accordance with an embodiment of the present invention.

In order to illustrate this, reference is made to FIG. 3. FIG. 3 shows an example, according to which the low quality layer operates with 8-bit sample values, i.e. luma and/or chroma values. An 8-bit value is exemplarily indicated at 300. Further, FIG. 3 assumes that the high quality layer operates based on 10-bit sample values 302. The arrow 304 pointing from 8-bit value 300 to 10-bit value 302 illustrates the inverse mapping performed by module 154 and underlies, in a modified way—as outlined above—, module 162. Of course, it would be possible to copy the bits of the 8-bit value 300 to the 8 most significant bits of the 10-bit value 302. This would correspond to a linear mapping from the 8-bit-depth to the 10-bit-depth. However, the mapping function is not restricted to linear mapping characteristics. At 306, FIG. 3 exemplarily shows a graph indicating a non-linear mapping from 8-bit values to 10-bit values. The characteristic mapping curve according to this example is indicated with 308. As can be seen, the gradient of curve 308 is exemplarily lower for higher 8-bit values and higher for smaller 8-bit values. Furthermore, along the x-axis of graph 306, which relates to the 8-bit values, FIG. 3 shows an arrow 310, which indicates an exemplarily 8-bit value of the prediction signal output by prediction module 126. Accordingly, an arrow 312 is shown to exemplarily indicate the 8-bit value of the reconstructed prediction residual as output by inverse transform module 120. As can be seen, summing both values 310 and 312 by means of adder 122 leads to a relatively high 8-bit value, which is mapped by module 162 by use of the non-linear mapping function 308 correctly to the 10-bit value 302. However, if module 154 would directly use the small 8-bit prediction residual value 312 and apply this value to curve 308, it can be seen that this would lead to an unduly augmentation of the resulting 10-bit residual value due to the higher gradient 314 of the mapping function 308 for very small 8-bit values (or at zero) than the gradient 316 in the area of curve 308 to which the low quality prediction signal value 310 points (when starting at zero). However, module 154 should not use the low quality prediction value 310 to shift the 8-bit residual value 312 to the correct portion of the mapping curve 308, since this would necessitate the decoder side to also perform the temporal prediction in the low quality layer. Rather, this necessity for performing both temporal predictions, i.e. for the low and high quality layers, should be avoided. Therefore, as can be seen in FIG. 1, inverse mapping and upsampling module 154 of the high quality encoding module 104 is provided with the high quality prediction signal output by prediction module 152 to be optionally added with the reconstructed version of the high quality residual signal as output by inverse transform module 136. Module 154 uses this information of the high quality layer in order to estimate the missing low quality prediction signal value 310 and correctly inversely map the 8-bit prediction residual value 300 to a 10-bit prediction residual value, which is output to adder 146. Details and different possibilities for this "correction"/"estimation" used by inverse mapping and upsampling module 154 will be described in more detail below.

Figure 4:
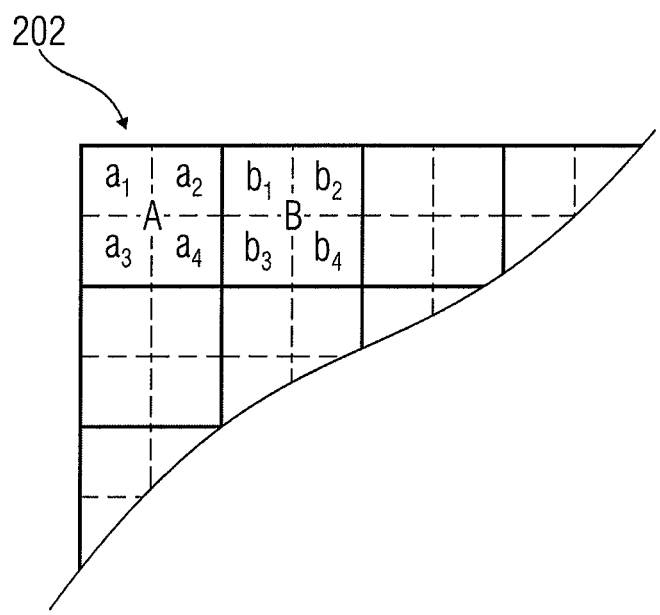
FIG. 4 is a schematic showing a portion of the upper left-hand corner of a picture of the video material to illustrate the spatial correspondence between pixels in the high quality layer and pixels in the low quality layer in accordance with an embodiment of the present invention.

However, before starting with the detailed description of the mode of operation of the inverse mapping and upsampling module 154, reference is made to FIG. 4, which illustrates an example for the spatial resolution difference between the high quality and the low quality layer in accordance with FIG. 1. As can be seen, FIG. 4 assumes that the down-sampling performed in module 106 leads to a low quality base layer representation having half a number of pixels in a row direction and half the number of pixels in a column direction. In particular, FIG. 4 shows, with continuous lines, the pixels of the low quality layer and, with dashed lines, the sub-division of picture 202 into pixels according to the high quality layer. As can be seen, each low quality pixel overlays exactly four, namely an array of 2×2, high quality pixels. For example, pixel A overlays high quality pixels $a_1$ to $a_4$. Of course, the example of FIG. 4 is merely illustrative and other spatial resolution ratios between the high and the low quality layer are possible as well, including, as mentioned above, no difference between both spatial resolutions, as well as anisotropic resolution ratios. FIG. 4 will be used in the following to illustrate the functionality of module 154 in deriving a substitute for the missing low quality prediction signal 310 for a current low quality prediction residual value 310.

In particular, after having described the functionality of the video encoder 100 of FIG. 1 in general terms, its functionality is described in detail in the following. As described, to achieve scalability of bit-depth as well as, optionally, spatial resolution, the quality reduction module firstly down-converts the high quality input video signal at input 110 to a base quality video signal entering low quality encoding module 102. This process of down-conversion may include a reduction of the bit-depth of the signal samples using any tone mapping scheme including, but not limited to, rounding of the sample values. Further, the down-conversion may involve a filtering of the input signal, such as an RGB to YCbCr conversion, a reduction of the spatial resolution of the input signal such as, for example, an HDTV to SDTV resolution conversion, or any combination of the aforementioned down-conversion measures. It is possible that module 106 uses different down-conversion schemes for each block 204 of each picture of the sequence as well as using the same scheme for all pictures.

In the next step, the base quality signal entering module 102 is coded using a non-scalable video coding scheme, such as, for example, H.264/AVC. The compressed video signal, which is obtained from this encoding process, forms the base quality representation and is output by module 102 to multiplexer 108. This base quality representation allows a decoding by legacy video decoders. For coding the high quality source signal, information already transmitted in the base quality representation is used to get a prediction of the high quality input signal such that the high quality enhancement layer signal output by module 104 only contains the coded prediction difference to the original high quality input sequence input at input 110. In the exemplarily case of FIG. 1, it is possible to adaptively select, for each block 206 of each picture 202, such as each macroblock in case of H.264/AVC, whether the inter-layer prediction mechanism is used for this block 206 or not. The inter-layer prediction mechanism not being used corresponds to the case where switch 152 assumes the position indicated with dotted lines, while switch 158 assumes the position indicated with continuous lines. That way, a fall-back to a simulcast-like operation according to which the high quality encoding module 104 and the low quality encoding module 102 completely operate independent from each other, is possible for picture regions where the inter-layer prediction mechanism fails. The way how the inter-layer prediction from the base quality representation is performed is now described in detail. It is reminded that for both base and high quality layers, two distinct motion-compensated prediction loops are employed.

In particular, the following detailed description describes a prediction process from base to high quality representation under a single-loop decoding constraint. Single-loop decoding specifies that for decoding of the high quality representation, it is not necessitated to completely decode the corresponding base quality representation. Especially, the rather complex operation of motion-compensated prediction only has to be performed using high quality pictures. Performing the considerably less complex intra-frame prediction process using base quality picture samples may still be necessitated in order to decode the corresponding high quality picture.

Firstly, the case of "intra-coded" base quality picture blocks 204 is considered, i.e. blocks, which are encoded without usage of the motion-compensated prediction. To be even more precise, those blocks 206 are considered overlaying blocks 204 which are encoded with a usage of the motion-compensated prediction within low quality encoding module 102. For these blocks 206, the decoded base quality picture samples, i.e. the reconstructed base quality video signal as provided at the output of adder 122, are directly used to obtain a prediction for the corresponding high quality picture samples as entering the high quality encoding module 104. The prediction process involves modules 162 and 160, where the mode of operation of the inverse mapping and upsampling module 162 may involve two steps:

1. Inverse tone mapping of the babe quality sample values to the higher bit-depth, e.g. 8-bit to 10-bit.
2. Upsampling of the low resolution base quality picture blocks 204 to the highest spatial resolution, e.g. CIF to 4CIF, in case base and high quality pictures are coded at different spatial resolutions, as it is assumed in the present case. In case the same spatial resolution is used, step 2 may be omitted or, alternatively, it can be viewed as a "no operation".

The order in which these two operations or steps are performed may either be fixed or it may be interchangeable, in which case the high quality encoding module 104 may be configured to transmit the order used as side information to the decoder, i.e. an indication is inserted into the side information contained in the high quality enhancement layer datastream that indicates the order used for the respective blocks 204.

The process of inverse tone mapping may, in particular, be performed in various ways. For example, for scalability in terms of bit-depth, the base quality samples at the input of module 162 may be multiplied by $2^{M-N}$, where M is the bit-depth of the high quality signal and N is the bit-depth of the base quality signal, which corresponds to a linear mapping. Alternatively, this may be viewed as a performance of a scaling and clipping of the base quality sample values at the input of module 162 according to min $(2^n \times 2^M - 1)$.

Alternatively, one of the following mapping mechanisms may be used for the prediction process. For example, piecewise linear mapping may be used where an arbitrary number of interpolation point's can be specified. For example, for a base quality sample with value x and two given interpolation points $(x_n, y_n)$ and $(x_{n+1}, y_{n+1})$ the corresponding prediction sample y is obtained by the module 162 according to the following formula $$y = y_n + \frac{x - x_n}{x_{n+1} - x_n}(y_{n+1} - y_n)$$

This linear interpolation can be performed with little computational complexity by using only bit shift instead of division operations if $x_{n+1} - x_n$ is restricted to be a power of two.

A further possible mapping mechanism represents a look-up table mapping in which, by means of the base quality sample values, a table look-up is performed in a look-up table in which for each possible base quality sample value the corresponding prediction sample value is specified. The look-up table may be provided to the decoder side as side information or may be known to the decoder side by default.

Further, scaling with a constant offset may used. According to this alternative, in order to achieve the corresponding high quality prediction sample y having higher bit-depth, module 162 multiplies the base quality samples x by a constant factor $2^{M-N-N}$, and afterwards a constant offset $2^{M-1} - 2^{M-1-K}$ is added, according to, for example, one of the following formulae:

$$y = 2^{M-N-K}x + 2^{M-1} - 2^{M-1-K} \text{ or}$$

$$y = \min(2^{M-N-K}x + 2^{M-1} - 2^{M-1-K}, 2^M - 1), \text{ respectively.}$$

By this measure, the low quality dynamic range $[0; 2^N - 1]$ is mapped to the second dynamic range $[0; 2^M - 1]$ in a manner according to which the mapped values of x are distributed in a centralized manner with respect to the possible dynamic range $[0; 2^M - 1]$ of y within a extension which is determined by K. The value of K could be an integer value or real value, and could be transmitted as side information to the decoder within, for example, the quality-scalable data stream so that at the decoder some predicting means may act the same way as the prediction module 134 as will be described in the following. With respect to the definition of M and N reference is made to the above description. A round operation may be used to get integer valued y values.

Another possibility is scaling with variable offset: the base quality samples x are multiplied by a constant factor, and afterwards a variable offset is added, according to, for example, one of the following formulae:

$$y = 2^{M-N-K}x + D \text{ or}$$

$$y = \min(2^{M-N-K}x + D, 2^M - 1)$$

By this measure, the low quality dynamic range is mapped to the second dynamic range in a manner according to which the mapped values of x are distributed within a portion of the possible dynamic range of y, the extension of which is determined by K, and the offset of which with respect to the lower boundary is determined by D. D may be integer or real. The result y represents a picture sample value of the high bit-depth prediction signal. The values of K and D could be transmitted as side information to the decoder within, for example, the quality-scalable data stream. Again, a round operation may be used to get integer valued y values, the latter being true also for the other examples given in the present application for the bit-depth mappings without explicitly stating it repeatedly.

An even further possibility is scaling with superposition: the high bit depth prediction samples y are obtained from the respective base quality sample x according to, for example, one of the following formulae, where floor(a) rounds a down to the nearest integer:

$y=\text{floor}(2^{M-N}x+2^{M-2N}x)$ or $y=\min(\text{floor}(2^{M-N}x+2^{M-2N}x),2^M-1)$ The just mentioned possibilities may be combined. For example, scaling with superposition and constant offset may be used: the high bit depth prediction samples y are obtained according to, for example, one of the following formulae, where floor(a) rounds a down to the nearest integer:

$y=\text{floor}(2^{M-N-K}x2^{M-2N-K}x+2^{M-1}-2^{M-1-K})$ $y=\min(\text{floor}(2^{M-N-K}x+2^{M-2N-K}x+2^{M-1}-2^{M-1-K}),2^M-1)$ The value of K may be specified as side information to the decoder.

Similarly, scaling with superposition and variable offset may be used: the high bit depth prediction samples y are obtained according to the following formula, where floor(a) rounds a down to the nearest integer:

$y=\text{floor}(2^{M-N-K}x+2^{M-2N-K}x+D)$ $y=\min(\text{floor}(2^{M-N-K}x+2^{M-2N-K}x+D),2^M-1)$ The values of D and K may be specified as side information to the decoder.

Further, it is possible to specify different mapping mechanisms for the luma and the chroma components of the base quality signal to take into account that the statistics, such as their probability density function, may be different. It is also possible to specify different mapping mechanisms for different regions of a picture, where a region not necessarily has to be contiguous. Furthermore, it is possible to specify that, after employing one of the above described mapping mechanisms, a pseudo-random noise signal ("dithering signal") is to be added to the high bit depth prediction signal within the prediction process preformed by prediction module at the encoder and at the decoder, respectively. Since this signal should be exactly known at the decoder to be able to decode the high bit depth representation, certain parameters as initialization value of the pseudo-random generator, variance and shape (e.g., normal or uniform distribution) of the pseudo-random process may have to be transmitted as side information. In case no such side information is transmitted in the scalable bit stream, default values, as for example a uniform distribution of pseudo-random values in the range [0, $2^{M-N}-1$] or [0, $2^{M-N-K}-1$] respectively, depending on the selected mapping mechanism, could be used.

Of course, it is possible to specify usage of different inverse tone mapping mechanisms for each block of each picture as well as using the same mechanism for the complete sequence.

In any case, it is emphasized that the mapping curve is not restricted to those defined by the above possibilities. In particular, the mapping curve is neither restricted to linear ones nor to partially linear ones.

Regarding the upsampling process of the base quality picture blocks within module 162 to the higher spatial resolution, the sample interpolation process may follow the one being described in the scalable video coding extension of the H.264/AVC video coding standard for the case of spatial scalability. As a straightforward solution, the inversely-mapped 10-bit value for a low resolution pixel sample A (see FIG. 4) may simply be copied to the corresponding four co-located high resolution pixel positions $A_1$ to $A_4$. The same would apply for the 8-bit value in case of the above two steps being switched.

Next, the case of "inter-coded" base quality picture blocks 204, i.e. blocks, which are encoded using motion-compensated prediction, are considered. To be more precise, the functionality of the high quality encoding module 104 in case of those blocks 206 is described, which overlay blocks 204 which are encoded using motion-compensated prediction within the low quality encoding model 102. Due to the above-mentioned single-loop decoding constraint, the decoded base quality picture samples output by adder 122 are not available to the decoder for decoding of the high quality representation. Therefore, the inter-layer prediction is, in this case, performed using the base quality residual data as output by subtractor 114 or the reconstructed version thereof as output by inverse transfer module 120. Due to this, in this case, the inter-layer prediction may be viewed as an inter-layer residual prediction.

For the sake of completeness only, it is noted that the motion data including, for example, motion vectors and reference picture indices, as used by the prediction module 126 to derive the low quality prediction signal, are included into the low quality base layer, so that this information is available at the decoder side for emulating the motion prediction performed by prediction module 126. The same applies, of course, to the prediction module 142. Prediction module 142 also creates motion data including motion vectors and reference picture indices in performing the temporal prediction, which motion data is included in the high quality enhancement layer signal output by module 104. In this regard, it is noted that the base quality motion data may be used as a prediction for the high quality motion data so that only the prediction residual of this inter-layer motion prediction may be encoded into the high quality enhancement layer.

As has been illustrated with respect to FIG. 3, expect for the trivial case of a linear inverse tone mapping operation such as, for example, via bit-shift operations, the inverse tone mapping can not be directly applied to the residual data entering inverse mapping and upsampling module 154, since the actual reconstructed low bit-depth sample value 310 would have to be known in order to be able to obtain a prediction of the corresponding high bit-depth sample value. The residual 312, however, is only a different signal and, therefore, additional measures are taken within module 154 relative to module 162, according to which the value of the reconstructed base quality sample 310 is estimated using the high quality prediction signal, the low quality residual data and, optionally, the high quality residual signal. In particular, the quality-adapted residual signal is obtained in one of the following ways:

1. In case of spatial scalability, which case is assumed here, each base quality residual sample corresponds to more than one high quality residual sample. To this end, reference is made to FIG. 4. A base quality residual sample for pixel A spatially corresponds to four high quality residual samples, namely $a_1$ to $a_4$. Therefore, in a first step, for each base quality residual sample A, a single corresponding high quality representative value is determined. In the simplest case; only the high quality motion-compensated prediction signal sample values $a_1$ to $a_4$ corresponding to the particular base quality residual sample A are considered, using either the mean value, the median value, or another distinct value obtained from the set of prediction signal sample values $a_1$ to $a_4$, such as, for example, their top-left sample value $a_1$, as their representative value. The same applies when using the sum of the high quality prediction signal sample values as output by prediction module 142 and the high quality residual sample values as output by inverse transform module 136 instead of only the prediction signal sample values. In case the same spatial resolution is used for both base and high quality pictures, the representative value is simply the co-located high quality prediction sample value, or the sum of the co-located high quality residual and prediction sample values.

Figure 5A:
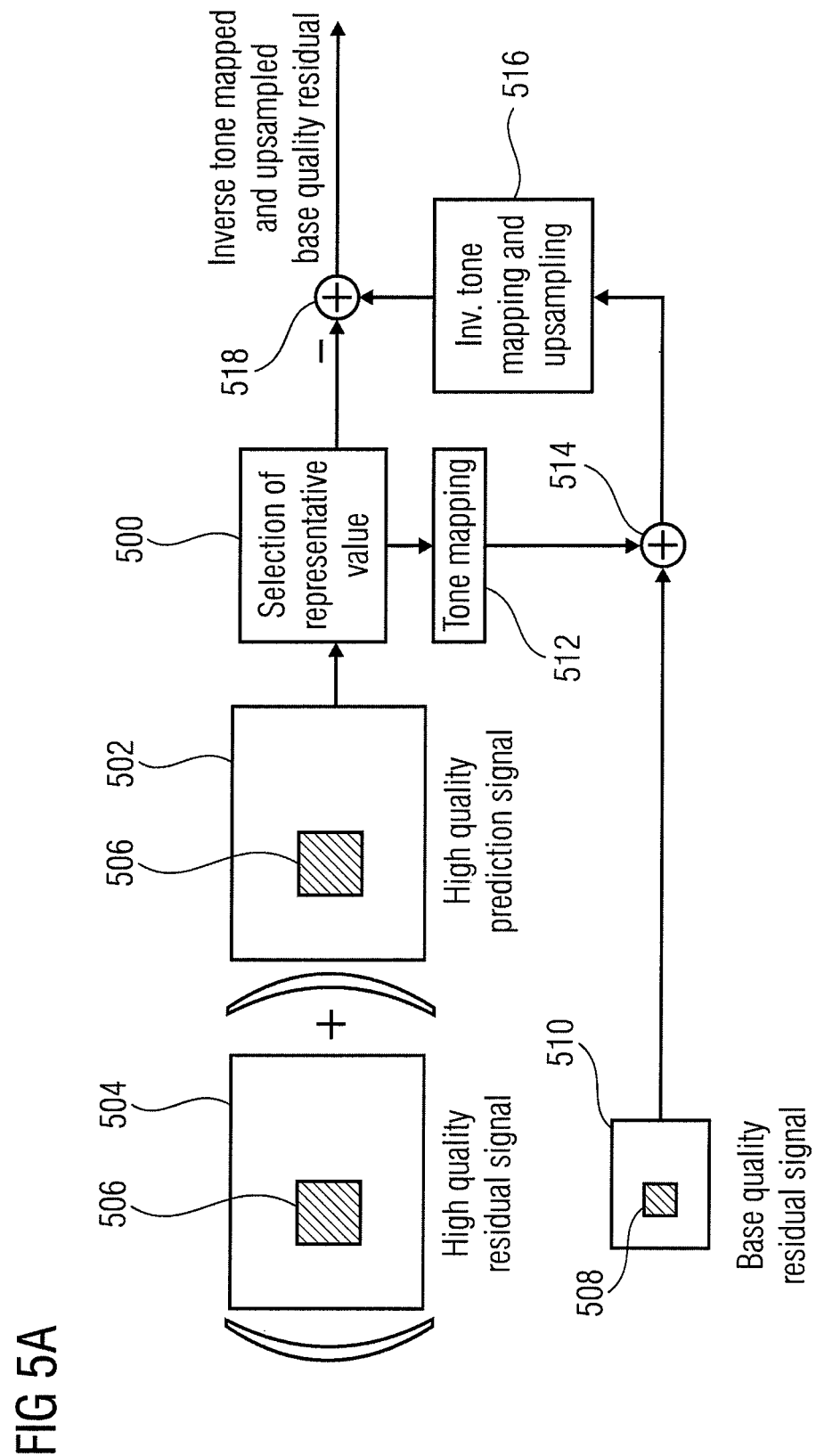
FIGS. 5a and 5b are schematic block diagrams illustrating an internal structure of the inverse residual tone mapping and upsampling module of FIG. 1 according to different embodiments of the present invention.

The representative value thus obtained is used in correcting the tone mapping in accordance with the first possible way, wherein reference is made to FIG. 5a for the ease of understanding. Reference 5a shows the functionality of module 154 incase of the first possible way of quality adaptation. The selection of the representative value just described is shown in FIG. 5a with reference sign 500. As just described, the selection of the representative value may include the high quality prediction signal 502 or both, the high quality prediction signal 502 and the high quality residual signal 504, with the optionallity of the high quality residual signal being indicated by the "( )" and the combination being indicated with the "+". The hatched portions 506 within the rectangles 502 and 504 representing the high quality residual and prediction signals, respectively, shall indicate the spatial positions or the spatial area within these signals 502 and 504, which spatially correspond to a pixel 508 within base quality residual signal 510, which has to be processed by inverse mapping and upsample sampling module 154.

The representative value selected in block 500 is used to obtain an estimate for the reconstructed low bit-depth sample value which is not available due to the single-loop decoding constraint. This estimate is obtained using the same tone mapping operation or a sufficient similar one that was used during the down-conversion stage of the high quality source sequence for the base quality encoding on the high quality representative value, i.e. within in quality reduction module 106. To be more precise, after the selection of the representative value within block 500, a tone mapping 512 is performed in order to convert the representative value thus obtained, such as a 10-bit value, into a value having a lower bit-depth, for example, 8 bits. Now, the slow bit-depth estimate value is output by block 512 and the low bit-depth residual sample value entering module 154 are summed up by an addition operation 514 in order to obtain a refined estimate of the low resolution, low bit-depth reconstructed sample value. This refined estimate is inverse tone-mapped in a block 516 with the block 516, in the case of spatial scalability as assumed here, also upsampling the refined estimate of the low resolution, low bit-depth reconstructed signal. The upsampling process may be in accordance with the process used for intra-coded base quality picture blocks, as described above. Finally, the difference between the inverse tone map and, possibly, upsampled refined estimate values and the high quality representative value as selected in block 500 is determined in subtractor block 518, the resulting difference representing the inverse residual tone mapped and upsampled base quality residual samples output by module 154 to adder 146.

2. The second way of obtaining the quality-adapted residual signal is described with reference to FIG. 5b. In this case, the sample values 506 within the high quality motion-compensated prediction signal 502 spatially corresponding to the low-quality sample value 508 of the base quality residual signal 510 or a sample-wise sum of these sample values 506 of the high quality motion-compensated prediction sample 502 and the sample values 506 of the high quality residual signal 504 are sample-wise tone-mapped 520 using the same tone mapping operation or a sufficient similar one that was used during the down-converting stage of the high quality source sequence for the base quality encoding, resulting in a high spatial resolution, low bit-depth representation. In case different spatial resolutions are used for the base and high quality pictures, as it is exemplarily assumed in the present case, the base quality residual samples 508 entering module 154 are upsampled 522 to the high quality spatial resolution, resulting also in a high spatial resolution, low bit-depth representation. Otherwise, i.e. in case of the same spatial resolution within the base and high quality layer, the original base quality residual samples 508, already at the high quality resolution, are used directly without block 522. These two high spatial resolution, low bit-depth signals are summed up 524 and afterwards inverse tone mapped 526 according to the process used for intra-coded base quality picture blocks as described previously, resulting again in a high spatial resolution, high bit-depth representation. The difference between the high quality motion-compensated prediction signal sample values or, in the optional case indicated by the sum of the high quality motion-compensated prediction signal sample values and the high quality residual signal samples, respectively, and this inverse tone mapped high spatial resolution, high bit-depth signal is determined within subtractor 528. The resulting inverse tone mapped high spatial resolution, high bit-depth signal represents the "inverse residual tone mapped and upsampled" base quality residual signal that is output by module 154 to adder 146.

Figure 5B:
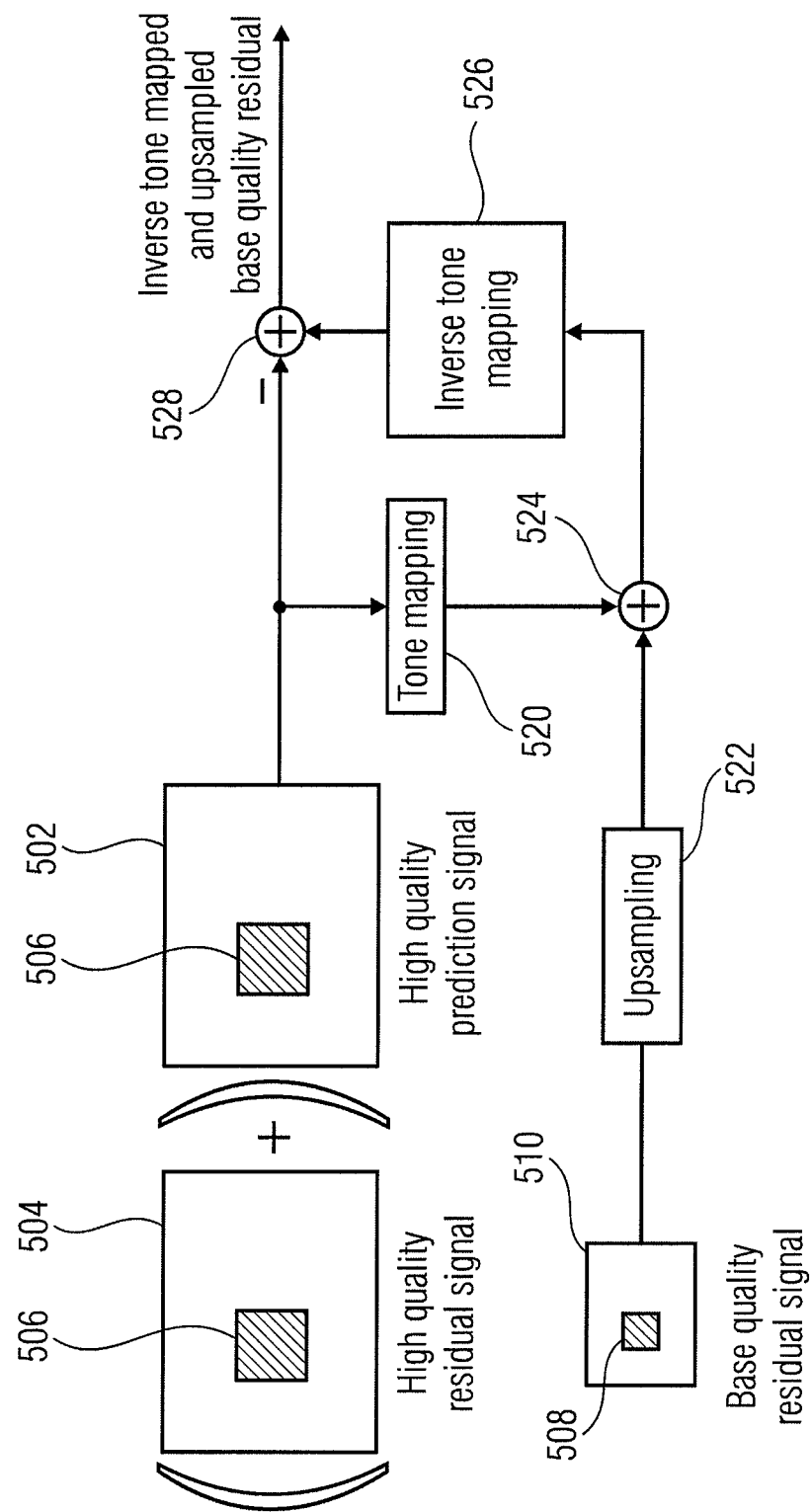

It may either be fixed, which of these two inter-layer residual prediction schemes will be used, or it may be variable, in which case an information may be inserted into side information contained in the high quality enhancement layer signal indicating to the decoder side which of options of FIGS. 5a and 5b has been used for a specific block 206.

In both options of FIGS. 5a and 5b, respectively, an indirection using first a forward tone mapping operating from high to low bit-depth domain, then adding the base quality residual and the low bit-depth domain, followed by an inverse tone mapping operation back to the high bit-depth domain, has been used. This indirection may be avoided according to another embodiment. For example, the "inverse" tone mapping characteristic curve 308 may be linearized using a first order Tailor approximation. In this case, the base quality residual sample value entering module 154 may be linearly scaled by a factor which depends on the corresponding high quality representative value as derived by a selection according to block 500, before the possible upsampling operation. Alternatively, in case of spatial scalability, upsampled otherwise original base quality residual sample values are linearly scaled by factors that depend on the corresponding high quality motion-compensated prediction signal sample values or the sum of the high quality motion-compensated prediction signal sample values and the high quality residual signal sample values, respectively. In other words, the bit-depth adaptation is combined with a scaling of the residual values according to the high quality signal arriving from adder 168, i.e. the high quality prediction signal or the combination of same with the high quality prediction residual.

As previously described, the inverse tone mapped and in accordance in the present example, upsampled base quality residual sample values output by module 154 are used then to refine the high quality prediction signal output by prediction module 142.

As to the inter-layer motion prediction, it is noted that the motion parameters, such as macroblock partitioning, reference picture indices and motion vectors in case of H.264/AVC used for coding of the high quality representation within prediction module 142, may be transmitted as a difference to a prediction using the corresponding parameters of the base quality representation within module 126 in order to achieve improved coding efficiency. This inter-layer motion prediction scheme is independent of the scalability in terms of sample bit-depth and, therefore, the mechanisms described in the scalable video coding extension of the H.264/AVC video coding standard may be used.

It should be noted, that according to another embodiment, the high quality encoding module 104 is not bound to the single-loop decoding constraint. In case there is no single-loop decoding constraint, all reconstructed base quality samples are available for decoding of the high quality representation, and the video encoder 100 may freely choose to use either the prediction mechanism involving inter-layer prediction path 150 or the prediction mechanism involving the inter-layer prediction path 148, both of which have been described previously. The decision among both prediction mechanisms may be made such that the best rate-distortion performance of the resulting scalable bit-stream at output 112 results. However, other decision criteria, such as, for example, reducing the necessitated encoding complexity, are also possible.

After having described embodiments for a video encoder, in the following, an embodiment of a video decoder is described with respect to FIG. 6. The video decoder 600 of FIG. 6 comprises a demultiplexer 602, an entropy decoding and inverse transform section 604 for reconstructing the base quality and high quality residual signals, a base quality reconstruction unit 606, as well as a high quality reconstruction unit 608. The high quality reconstruction unit 608, in turn, comprises a temporal prediction unit 610 and a reconstruction unit 612.

Figure 6:
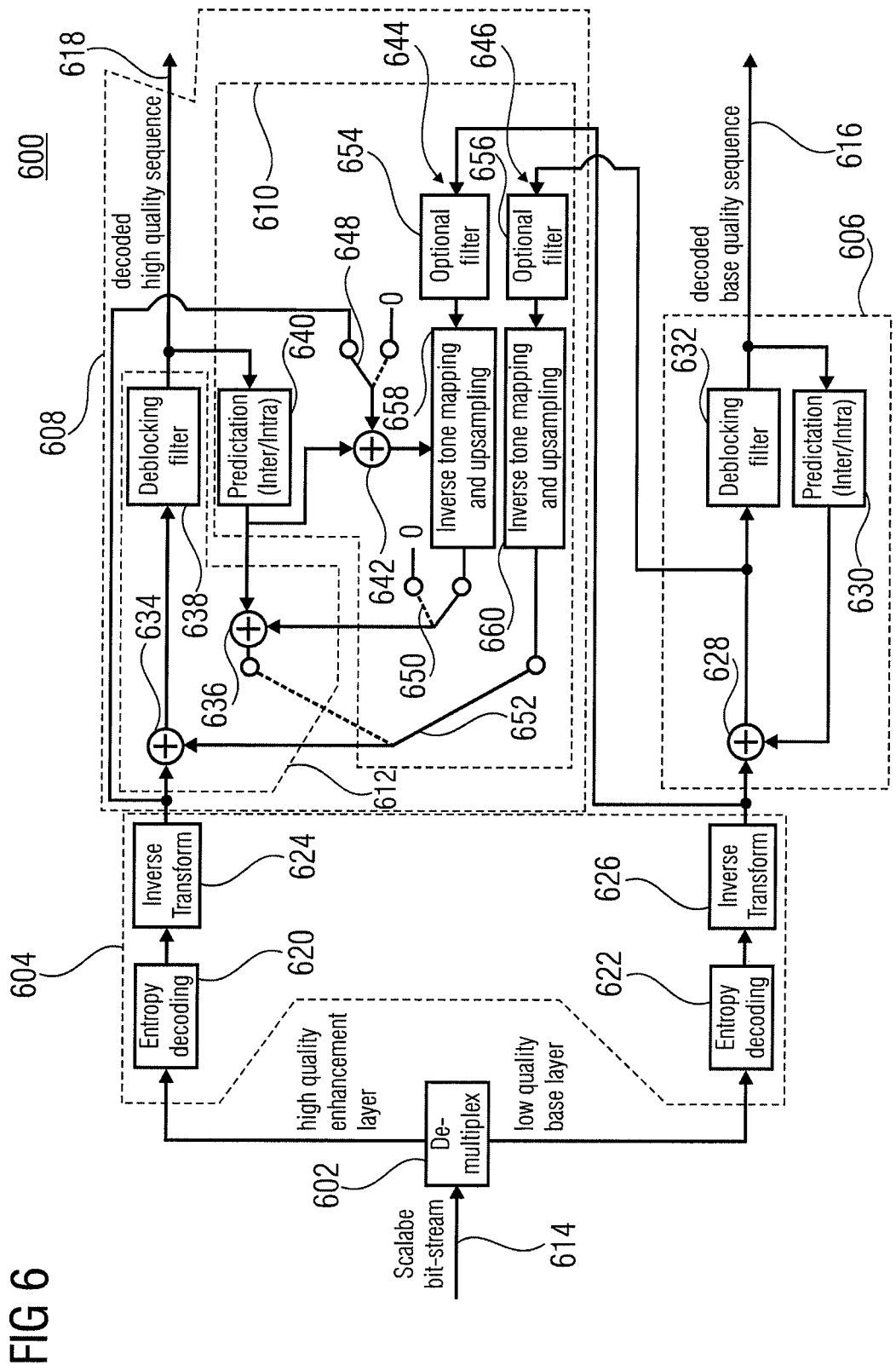
FIG. 6 is a block diagram of a video decoder in accordance with an embodiment of the present invention.
Figure 7:
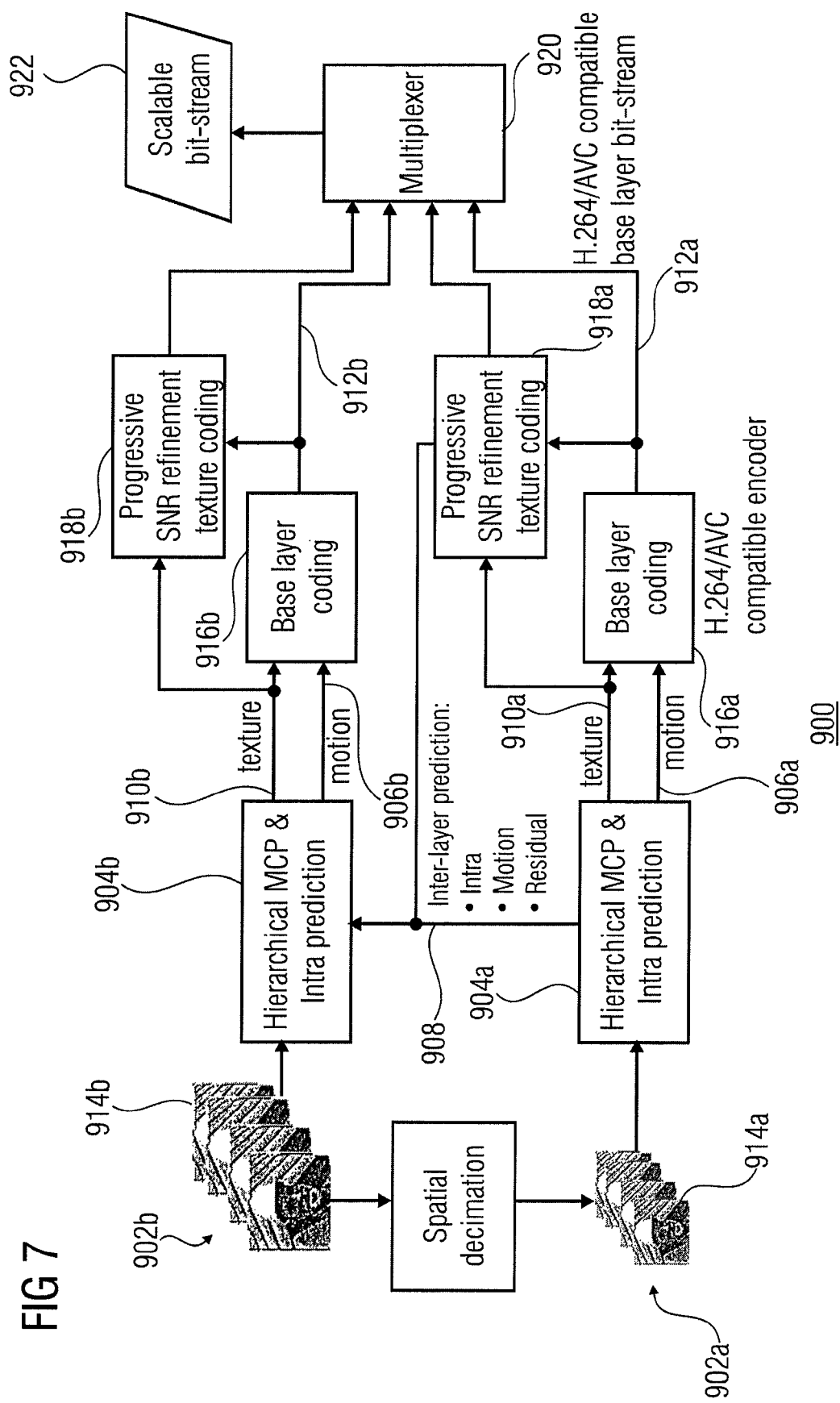
FIG. 7 is a block diagram of a conventional coder structure for scalable video coding.

The decoder 600 of FIG. 6 is able to decode the scalable bit-stream output at output 112 of video encoder 100 of FIG. 1. In particular, the video decoder 600 comprises an input 614 for receiving the scalable bit-stream and is able to extract from this scalable bit-stream both the base quality sequence as well as the high quality sequence. To this end, the decoder 600 of FIG. 6 comprises an output 616 for the decoded base quality sequence and an output 618 for the decoded high quality sequence. Although decoder 600 is able to extract both the high quality sequence as well as the low quality sequence, it is noted that, according to another embodiment, the decoder 600 may not comprise output 616.

An input of the demultiplexer 602 is connected to the input 614. The demultiplexer 602 comprises two outputs, one for the high quality enhancement layer signal and the other for the low quality base layer signal. Both outputs are connected to respective inputs of the residual signal reconstruction unit 604. Internally, the residual signal reconstruction unit 604 comprises two series connections of an entropy decoding unit 620 and 622 respectively, followed by an inverse transform unit 624 and 626, respectively. Each series connection is connected to a different one of the outputs of the demultiplexer 602. In particular, the residual signal reconstruction unit 604 comprises two outputs, wherein the entropy decoding unit 620 and the inverse transform unit 624 are connected between one of these outputs and the high quality enhancement layer output of demultiplexer 602, whereas entropy decoding unit 622 and inverse transform unit 626 are connected between the other output and the low quality base layer output of demultiplexer 602.

Entropy decoding unit 620 reverses the entropy coding performed by entropy coding unit 144, while entropy decoding unit 622 reverses the entropy coding performed by entropy coding unit 128. Inverse transform unit 624 equals, in terms of its operation, inverse transform unit 136, while inverse transform unit 626 corresponds to inverse transform unit 120. Thus, at the output of inverse transform unit 624, the reconstructed high quality residual signal as output by inverse transform unit 136 is made available, whereas inverse transform unit 626 outputs a reconstructed version of the low quality residual signal just as it is the case with inverse transform unit 120 within low quality encoding module 102.

The base quality reconstruction unit 606 is composed of elements corresponding to elements 122-126 of low quality encoding module 102. In particular, low quality reconstruction unit 606 comprises an adder 628, a prediction unit 630 and a deblocking filter 632, with these elements corresponding to elements 122, 126 and 124, respectively. In particular, adder 628 and deblocking filter 632 are serially connected in the order mentioned between the output of inverse transform unit 626 and output 616, whereas prediction unit 630 is connected between the output of deblocking filter 632 and a further input of adder 628.

Within high quality reconstruction unit 608, the reconstruction unit 612 is composed of elements corresponding to elements 146, 138 and 140 of the high quality encoding module 104. Similarly, the prediction unit 610 is composed of elements corresponding to elements 142, 164 and 148 to 162. To be more precise, the reconstruction unit 612 comprises an adder 634, a further adder 636 and a deblocking filter 638, wherein adder 634 and deblocking filter 638 are serially connected in the order mentioned between the output of inverse transform module 624 and output 618. The prediction unit 610 comprises a prediction unit 640, an adder 642, a first inter-layer prediction path 644, a second inter-layer prediction path 646, and three switches 648, 650 and 652. Into each of paths 644 and 646, a series connection of an optional filter 654 and 656, respectively, and an inverse mapping and upsampling module 658 and 660 are connected. Elements 640 to 652 correspond in terms of functionality as well as interconnection to the elements 148 to 164 and 142 of FIG. 1, with the additional switch 648 illustrating—similarly to the dashed line in FIG. 1—the optionallity of the contribution of the output of inverse transform unit 624 and 136, respectively, to the correction of the inverse mapping performed by module 658 and 154, respectively. Especially, switch 148 makes clear that it is also possible to allow the encoder 100 to decide as to whether the high quality prediction signal is used in combination with the high quality residual or as to whether the high quality prediction signal is used alone, in which case, switch 648 applies a zero to the further input of adder 642. In this case, respective side information within the high-quality enhancement layer signal may be used by high quality reconstruction unit 608 to decide how to steer switch 648. The side information would be provided by the high quality encoding module 104 via the scalable bit-stream.

For the sake of completeness, it is noted that switch 648 is connected between the further input of adder 642 and the output of inverse transform unit 624, and that path 646 extends from the output of adder 628 via switch 652 to the further input of adder 634, while the first inter-layer prediction path 644 extends from the output of inverse transform unit 626 via switch 650 to a further input of adder 636. Further, prediction unit 640 is connected between the output of the deblocking filter 638 and a further input of adder 636, the output of which is connected to the further input of adder 634 via switch 652.

In reconstructing the high quality video signal, the decoder 600 operates in the following way. Firstly, the scalable bit-stream at input 614 is demultiplexed by demultiplexer 602 to gain access to the high quality enhancement layer on the one hand, and the low quality base layer on the other hand. After entropy decoding by units 620 and 622, respectively, the resulting transform coefficients are subject to the inverse transformation performed by inverse transform units 624 and 626, respectively. At the output of inverse transform unit 624, a reconstructed version of the high quality prediction residual results. Similarly, at the output of inverse transform unit 626 a reconstructed version of the low quality prediction residual results. The prediction unit 640 uses the decoded high quality sequence to perform temporal prediction, such as motion-compensated prediction. To this end, prediction module 640 uses temporal prediction data such as motion data created by prediction module 142 and having been encoded into high quality enhancement layer signal. This high quality prediction signal is refined by adder 636 by adding a prediction for the prediction residual as obtained by inter-layer prediction path 644. At least, this is true for the blocks 206, for which the high quality encoding module 104 used path 148 with these blocks being identifiable, for example, from respective side information within scalable bit-stream or from the low quality base layer signal. For these blocks, the switches 648 and 650 assume the positions indicated with continuous lines in FIG. 6, whereas switch 652 assumes the position indicated with a dashed line. The refined prediction signal is forwarded via switch 652 to adder 634 which adds to the reconstructed high quality prediction residual the refined prediction signal. Thereupon, the deblocking filter 638 performs a deblocking filtering in order to gain the decoded high quality sequence and output same at output 618.

For those blocks 206, for which the high quality encoding module 104 used path 150, switch 652 assumes the position indicated with a continuous line in FIG. 6, whereas switch 650 assumes the other position, i.e. the dashed line. Regarding the identification of these blocks, reference is made to the just described functionality with respect to the other inter-layer predicted blocks. In the case of these blocks, adder 634 adds to the reconstructed high quality prediction residual the reconstructed base quality video signal in inversely mapped and upsampled form as obtained via path 646 from the output of adder 628. In particular, the prediction unit 630 performs a temporal prediction for blocks 204, for which temporal prediction has been used in the low quality encoding module 102. Adder 628 adds this prediction signal to the reconstructed low quality prediction residual in order to output the reconstructed version of the base quality video signal used by path 646. Again, it is noted that also the prediction unit 630 performs the temporal prediction on the base quality layer in accordance with temporal prediction data, such as motion compensation data, as having been used and inserted into the low quality base layer by the prediction module 126 of the low quality encoding module 102.

Regarding the further blocks of decoder 600 not having described so far, reference is made to the above description of the video encoder 100, since with regard to these blocks, exactly the same steps are performed, as it was the case within the encoder. This is especially true for the inverse mapping and upsampling units 658 and 660 and the estimation of the base quality prediction signal by the inverse mapping and upsampling unit 658 by use of either the prediction signal or the sum of the prediction signal of prediction unit 640 and the reconstructed version of the high quality prediction residual, as provided via switch 648 to adder 642.

Finally, it is noted that the inverse tone mapped and (possibly) upsampled base quality residual sample values as leaving unit 658 are added to the coded high quality residual sample values entering adder 634 thereby obtaining an effective high bit-depth, high resolution prediction residual signal which is used in the decoding process, to reconstruct, based thereon and the prediction signal leaving prediction unit 640, the high quality sequence, and that it is possible to fulfill the single-loop constraint so that, for each portion of the video, merely one temporal prediction at the maximum is necessitated in order to decode the video content at the high quality.

When transferring the embodiment of the decoder of FIG. 6 to the environment of H.264/AVC, the decoding of the base quality representation by use of elements 622, 626 and 606 fully complies with the H.264/AVC. The only additional steps necessitated for decoding of the high quality representation in comparison to spatial scalability operation without bit-depth scalability as described in the above mentioned proposals for the SVC, are the inverse tone mapping and, in case of spatial scalability, upsampling operation for the decoded base quality picture samples, which is employed instead of the inter-layer interpretation in SVC, and the inverse residual tone mapping and, in case of spatial scalability, upsampling operation for the base quality residual samples, which is employed instead of the inter-layer residual prediction in SVC.

In other words, the above embodiments describe a video coder (encoder/decoder) for coding (encoding/decoding) a layered representation of a video signal comprising a standardized video coding method for coding a base quality layer, a prediction method for performing a prediction of the high quality enhancement layer signal by using the reconstructed base quality signal in case of intra-coded base quality picture blocks or in case no single-loop decoding constraint has to be obeyed, a prediction method for performing a prediction of the high quality enhancement layer residual signal by using the decoded base quality residual signal in case of inter-coded base quality picture blocks, in the following called "inter-layer residual prediction", a residual coding method for coding of the prediction residual of the high quality enhancement layer signal and a coding method for coding the high quality enhancement layer prediction modes.

The inter-layer intra prediction may be performed by, in case of spatial scalability (i.e., usage of different spatial resolutions for base and high quality layer), upsampling of the base quality layer signal, and using a mapping function from the dynamic range associated with the base quality layer to the dynamic range associated with the high quality enhancement layer, where the order of the upsampling and mapping operations may either be fixed or interchangeable, in which case it may be transmitted as side information to the decoder.

The inter-layer intra prediction may also be performed by, in case of spatial scalability (i.e., usage of different spatial resolutions for base and high quality layer), upsampling of the base quality layer signal, and scaling and clipping the sample values x of the (possibly upsampled) base quality layer according to $$\min(2^{M-N}x, 2^M-1),$$

where the sample values x of the base quality layer are represented with a bit depth of N and the sample values of the high quality enhancement layer are represented with a bit depth of M with M>N. The order of the upsampling and the scaling and clipping operations may either be fixed or interchangeable, in which case same should be transmitted as side information to the decoder.

Further, the inter-layer intra prediction may be performed by, in case of spatial scalability (i.e., usage of different spatial resolutions for base and high quality layer), upsampling of the base quality layer signal, and using a piecewise linear mapping with a given number of interpolation points transmitted as a side information, where the order of the upsampling and linear interpolation mapping operations may either be fixed or interchangeable, in which case it should be transmitted as side information to the decoder.

The inter-layer intra prediction may alternatively be performed by, in case of spatial scalability (i.e., usage of different spatial resolutions for base and high quality layer), upsampling of the base quality layer signal, and by using the value of the (possibly upsampled) base quality signal sample for indexing a look-up table, which contains the corresponding high quality sample values and which may be transmitted as a side information, where the order of the upsampling and look-up table mapping operations may either be fixed or interchangeable, in which case it could be transmitted as side information to the decoder.

Another possibility is that the inter-layer inter prediction is performed by, in case of spatial scalability (i.e., usage of different spatial resolutions for base and high quality layer), upsampling of the base quality residual signal, and by using a mapping function from the dynamic range associated with the base quality layer to the dynamic range associated with the high quality enhancement layer, where the order of the upsampling and mapping operations may either be fixed or interchangeable, in which case it could be transmitted as side information to the decoder. According to a further embodiment, the inter-layer inter prediction is performed by, in case of spatial scalability (i.e., usage of different spatial resolutions for base and high quality layer), upsampling of the base quality residual signal, and by using a piecewise linear mapping with a given number of interpolation points transmitted as a side information, where the order of the upsampling and linear interpolation mapping operations may either be fixed or interchangeable, in which case it could be transmitted as side information to the decoder.

Alternatively, the inter-layer inter prediction is performed by determining for each base quality sample a high quality representative value (which may be the mean value, the median value, or another distinct value) from the set of the co-located high quality prediction signal sample values (which may consist of only one single value in case the same spatial resolution is used for both base and high quality pictures), then performing a tone mapping operation on the high quality representative values, combining this tone mapped high quality representative values with the corresponding base quality residual sample values (e.g., via an addition operation), then inverse tone mapping and, in case of spatial scalability (i.e., usage of different spatial resolutions for base and high quality layer), upsampling this combined signal using a method described above, and finally determining the difference between the inverse tone mapped and (possibly) upsampled combined signal and the high quality representative values.

A further alternative is that the inter-layer inter prediction is performed by determining for each base quality sample a high quality representative value (which may be the mean value, the median value, or another distinct value) from the set of the sum of the co-located high quality prediction signal sample values and the corresponding high quality residual signal sample values (which may consist of only one single value in case the same spatial resolution is used for both base and high quality pictures), then performing a tone mapping operation on the high quality representative values, combining this tone mapped high quality representative values with the corresponding base quality residual sample values (e.g., via an addition operation), then inverse tone mapping and, in case of spatial scalability (i.e., usage of different spatial resolutions for base and high quality layer), upsampling this combined signal using a method described above, and finally determining the difference between the inverse tone mapped and (possibly) upsampled combined signal and the high quality representative values.

A further modification would be that the inter-layer inter prediction is performed by combining (e.g., via an addition operation) the, in case of spatial scalability (i.e., usage of different spatial resolutions for base and high quality layer) upsampled, otherwise original base quality residual sample values and the co-located tone mapped high quality prediction signal sample values, then inverse tone mapping this combined signal using a method just described in above without the upsampling step, and finally determining the difference between the inverse tone mapped combined signal and the high quality prediction signal.

In this regard, a further modification would be that the inter-layer inter prediction is performed by combining (e.g., via an addition operation) the, in case of spatial scalability (i.e., usage of different spatial resolutions for base and high quality layer) upsampled, otherwise original base quality residual sample values and the sum of the co-located tone mapped high quality prediction signal sample values and the corresponding high quality residual signal sample values, then inverse tone mapping this combined signal using a method just described within the above alternatives without the upsampling step, and finally determining the difference between the inverse tone mapped combined signal and the sum of the high quality prediction and residual signal. A further alternative is that the inter-layer inter prediction is performed by, in case of spatial scalability (i.e., usage of different spatial resolutions for base and high quality layer), upsampling, and by scaling the (possibly upsampled) base quality residual sample values with a scaling factor, that depends on the value of the co-located high quality prediction signal sample and may be obtained by indexing a look-up table. This look-up table may either be transmitted as side-information or may already be known to the decoder. The order of the upsampling and the scaling operations may either be fixed or interchangeable, in which case it may be transmitted as side information to the decoder. According to an even further alternative, the inter-layer inter prediction is performed by, in case of spatial scalability (i.e., usage of different spatial resolutions for base and high quality layer), upsampling, and by scaling the (possibly upsampled) base quality residual sample values with a scaling factor, that depends on the value of the sum of the co-located high quality prediction signal sample and the corresponding high quality residual signal sample and may be obtained by indexing a look-up table. This look-up table may either be transmitted as side-information or may already be known to the decoder. The order of the upsampling and the scaling operations may either be fixed or interchangeable, in which case it may be transmitted as side information to the decoder.

The residual coding may be performed along the specification of H.264/AVC and may be also performed along the specification of H.264/AVC.

It is noted that modifications may be made to the above described embodiments. For example, instead of positioning the adder 146 between the output of predictor unit 142 and the inverting input of subtractor 130, the output of inverse mapping and upsampling module 154 may be provided, via switch 152, to another subtractor positioned between the input of transform module 132 and input 110 and a further adder connected between the output of inverse transform module 136 and the input of deblocking filter 140. For filters 140 to 124 and the corresponding element in the decoder may be removed. Moreover, the entropy decoding and entropy coding modules may be replaced by other coding modules or may be left out. In turn, as the entropy coding scheme, Huffman coding or variable length coding may be used as well as arithmetic coding. The transformation and inverse transformation involved in coding and decoding the prediction residuals could operate block-wise with a block size of the transformation being, for example, smaller than the macroblocks in the units of which the encoding modules 102 and 104 may decide on inter/intra prediction or inter-layer prediction or not, respectively. Regarding the motion-compensation or temporal prediction, in turn, this prediction may also be performed on a block-wise basis with a block size being, for example, between that of the transform blocks and that of the macroblocks. Moreover, it is especially noted that the blockwise switching between the above-mentioned inter-layer mode is not necessitated. Rather, the above embodiment could be amended such that merely the inter-layer prediction mode using paths 644 ad 148, respectively, would be activated.

Moreover, although not explicitly noted above, the steps performed in the inverse mapping and upsampling modules could involve other quality adaptation measures as well, depending on the quality reduction measures performed in the quality reduction module 106. Moreover, it is noted that, although not explicitly described with respect to FIG. 6, all the side information having been described to be inserted into the scalable bit-stream is used in the decoder of FIG. 6 to respectively control the corresponding elements. Further, in the above embodiments, the reconstructed version of the low quality prediction residual was used for refining the prediction in the high quality layer. However, as a precautionary measure only it is noted that the encoder could use the low quality prediction residual as output by subtractor 114 as well. The use of the reconstructed version as output by inverse transform module 120 is, however, advantageous in that the reconstructed version is available at decoder side whereas the original low quality prediction residual may merely estimated by the decoder to correspond to the reconstructed version. Similarly, although according to the above description closed loop predictions were used, open loop predictions may be used as well, i.e. temporal predictions based on the input signal rather than the reconstructed signal.

In other words, the above embodiments enable the provision of a possible extension of SVC toward scalability in terms of sample bit-depth, as an example for pixel value resolution, and, optionally, spatial resolution. In particular, the possible extension enables the encoder to store a base quality representation of a video sequence, which can be decoded by any legacy video decoder, together with an enhancement signal for higher bit depth and, optionally, higher spatial resolution which is ignored by legacy video decoders. For example, the base quality representation could contain an 8 bit version of the video sequence in CIF resolution (352×288 samples), while the high quality enhancement signal contains a "refinement" to a 10 bit version in 4CIF resolution (704×576 samples) of the same sequence. In a different configuration, it is also possible to use the same spatial resolution for both base and enhancement quality representation, such that the high quality enhancement signal only contains a refinement of the sample bit-depth, e.g. from 8 to 10 bit. In even other words, from the above described embodiments, a concept for scalable coding of video with different representations in terms of pixel value resolution and, optionally, spatial resolution is readily available, wherein both the temporal and spatial prediction processes as specified in the current Working Draft of the scalable H.264/MPEG4-AVC extension are extended in a way that they include mappings from lower to higher sample bit-depth fidelity or pixel value resolution in general, as well as, optionally, from lower to higher spatial resolution.

Finally, it is noted that the present invention may be implemented in software, hardware or in a programmable hardware, such as a field programmable gate array. In this regard, it is noted that, although modules and units shown in FIGS. 1 and 6 may correspond with respective steps performed in a respective encoding/decoding method and that, in turn, the blocks shown in FIGS. 5a and 5b may correspond with respective hardware portions of an integrated circuit or program portions of a computer program fulfilling the respective functionality described above.

Especially, depending on certain implementation requirements of the above embodiments, these embodiments can be implemented in hardware or in software. The implementation can be performed using a digital storage medium, in particular, a disc or a CD having electronically readable control signals stored thereon, which can cooperate with a programmable computer system, such that the respective methods are performed. Generally, the above embodiments are, therefore, able to be embodied in a computer program product with a program code stored on a machine-readable carrier, the program code being configured to perform the respective method, when the computer program product runs on a computer. In other words, the above-described methods of encoding/decoding are, therefore, a computer program having a program code for performing the inventive methods, when the computer program runs on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:
1. A video encoding device comprising:
a first predictor configured to temporally predict a first representation of a video material to acquire a first prediction signal, and code a first prediction residual representing a deviation between the first prediction signal and the first representation, the first representation, the first prediction signal and the first prediction residual being of a first pixel value resolution; and
a second predictor configured to temporally predict a second representation of the video material to acquire a second prediction signal, the second representation and the second prediction signal being of a second pixel value resolution being higher than the first pixel value resolution, wherein the second predictor is configured to map, dependent on the second prediction signal, the first prediction residual or a reconstructed version of the first prediction residual from the first pixel value resolution to the second pixel value resolution to acquire a third prediction signal and code a second prediction residual being of the second pixel value resolution and representing a deviation between a combination of the second and third prediction signals and the second representation;
wherein the second predictor is configured to
map one of the second prediction signal or a combination of the second prediction signal and the second prediction residual from the second pixel value resolution to the first pixel value resolution to acquire a down-mapped offset signal;
map a combination of the down-mapped offset signal and the first prediction residual or the reconstructed version of the first prediction residual from the first pixel value resolution to the second pixel value resolution to acquire an up-mapped signal, and subtract the one of the second prediction signal or the combination of the second prediction signal and the second prediction residual from the up-mapped signal to acquire the third prediction signal.

2. The video encoding device according to claim 1, wherein the first predictor comprises:

a subtractor configured to subtract the first prediction signal from the first representation to acquire the first prediction residual;

coder configured to lossy transform code the first prediction residual to acquire a transform coded version of the first prediction residual;

a reconstructor configured to reconstruct the first prediction residual from the transform-coded version to acquire the reconstructed version of the first prediction residual;

an adder configured to add the reconstructed version of the first prediction residual and the first prediction signal to acquire a reconstructed version of the first representation; and a performer configured to perform a temporal prediction on the reconstructed version of the first representation to acquire the first prediction signal.

3. The video encoding device according to claim 1, wherein the second predictor comprises:

a subtractor configured to subtract the second prediction signal and the third prediction signal from the second representation to acquire the second prediction residual;

a coder configured to lossy transform code the second prediction residual to acquire a transform-coded version of the second prediction residual;

a reconstructor configured to reconstruct the second prediction residual from the transform-coded version of the second prediction residual to acquire a reconstructed version of the second prediction residual;

an adder configured to add the reconstructed version of the second prediction residual, the third prediction signal and the second prediction signal to acquire a reconstructed version of the second representation; and a performer configured to perform a temporal prediction on the reconstructed version of the second representation to acquire the second prediction signal.

4. The video encoding device according to claim 1, wherein the second predictor is further configured to in mapping the one of the second prediction signal or the combination of the second prediction signal and the second prediction residual, also perform a reduction in spatial pixel sampling resolution on the one of the second prediction signal or the combination of the second prediction signal and the second prediction residual and use the reduction result to acquire the down-mapped offset signal; and in mapping the combination of the down-mapped offset signal and the first prediction residual or the reconstructed version of the first prediction residual, also perform a spatial up-sampling on the combination of the down-mapped offset signal and the first prediction residual or the reconstructed version of the first prediction residual and use the up-sampling result to acquire the up-mapped signal.

5. The video encoding device according to claim 1, wherein the second predictor is further configured to in mapping a combination of the down-mapped offset signal and the first prediction residual or the reconstructed version of the first prediction residual, also perform a spatial up-sampling on the first prediction residual or the reconstructed version of the first prediction residual and use the up-sampling result to acquire the up-mapped signal.

6. The video encoding device according to claim 1, wherein the second predictor is further configured to in a first operating mode, in mapping the one of the second prediction signal or the combination of the second prediction signal and the second prediction residual, also perform a reduction in spatial pixel sampling resolution on the one of the second prediction signal or the combination of the second prediction signal and the second prediction residual and use the reduction result to acquire the down-mapped offset signal;

and in mapping the combination of the down-mapped offset signal and the first prediction residual or the reconstructed version of the first prediction residual, also perform a spatial up-sampling on the combination of the down-mapped offset signal and the first prediction residual or the reconstructed version of the first prediction residual and use the up-sampling result to acquire the up-mapped signal in a second operating mode, in mapping a combination of the down-mapped offset signal and the first prediction residual or the reconstructed version of the first prediction residual, also perform a spatial up-sampling on the first prediction residual or the reconstructed version of the first prediction residual and use the up-sampling result to acquire the up-mapped signal, and wherein the video material is divided into a plurality of blocks and the second predictor is configured to operate block-selectively in the first or the second operating mode and to indicate, in side information for a decoder-side, as to whether the first operating mode or the second operating mode has been used for a predetermined block.

7. The video encoding device according claim 1, wherein the second predictor is configured to map the first prediction residual or reconstructed version of the first prediction residual from a first pixel value bit-depth to a second pixel value bit-depth being higher than the first pixel value bit-depth with scaling the mapped first prediction residual or the mapped reconstructed version of the first prediction residual with a scaling factor being dependent on the second prediction signal.

8. The video encoding device according to claim 1, wherein the video material is divided into a plurality of blocks, and the first predictor is configured to operate block-selectivity such that for at least one first block, the first prediction residual is coded, and for at least one second block, the first representation is coded independent of the temporal prediction, and wherein the second predictor is configured to code, for the at least one first block, the second prediction residual, and for the at least one second block, map a reconstructed version of the first representation from the first pixel value resolution to the second pixel value resolution to acquire an up-sampled reconstructed version of the first representation, and code a deviation between the second representation and the up-sampled reconstructed version of the first representation.

9. The video encoding device according to claim 8, wherein the second predictor is further configured to in mapping the reconstructed version of the first representation, also perform an spatial up-sampling on the reconstructed version of the first representation and use the up-sampling result to acquire the up-sampled reconstructed version of the first representation.

10. The video encoding device according to claim 9, wherein the second predictor is configured to block-selectively change an order between the performance of the up-sampling and the mapping and to indicate, in side information for a decoder side, the order used.

11. A video encoding device according to claim 1, wherein the second predictor is configured to, in mapping the first prediction residual or the reconstructed version of the first prediction residual from the first pixel value resolution to the second pixel value resolution, use an area out of a domain of a non-linear mapping function from a dynamic range associated with the first pixel value resolution as the domain of the non-linear function to the dynamic range associated with the second pixel value resolution as a codomain of the non-linear function, and use the second prediction signal as an estimation of the first prediction signal so as to locate the area so as to obtain the third prediction signal.

12. A video decoding device for decoding a scalable video signal representing a video material with a first and a second pixel value resolution with the second pixel value resolution being higher than the first pixel value resolution, the scalable video signal having coded therein a first prediction residual of the first pixel value resolution and a second prediction residual of the second pixel value resolution, comprising:
   a decoder configured to reconstruct the first and second prediction residuals from the scalable video signal;
   a predictor configured to temporally predict the second representation of the video material to acquire a second prediction signal, the second representation and the second prediction signal being of the second pixel value resolution, wherein the predictor is configured to map, dependent on the second prediction signal, the first prediction residual from the first pixel value resolution to the second pixel value resolution to acquire a third prediction signal; and
   a reconstructor configured to reconstruct the second representation based on the second prediction signal, the third prediction signal and the second prediction residual;
   wherein the predictor is configured to
   map one of the second prediction signal or a combination of the second prediction signal and the second prediction residual from the second pixel value resolution to the first pixel value resolution to acquire a down-mapped offset signal;
   map a combination of the down-mapped offset signal and the first prediction residual from the first pixel value resolution to the second pixel value resolution to acquire an up-mapped signal, and
   subtract the one of the second prediction signal or the combination of the second prediction signal and the second prediction residual from the up-mapped signal to acquire the third prediction signal.

13. The video decoding device according to claim 12, wherein the decoder is configured to reconstruct the first and second prediction residuals by inverse transformation.

14. The video decoding device according to claim 13, wherein the predictor is coupled to the reconstructor to acquire a reconstructed version of the second representation, and further comprises
   a performer configured to perform a temporally prediction on the reconstructed version of the second representation to acquire the second prediction signal.

15. The video decoding device according to claim 12, wherein the predictor is further configured to
   in mapping the one of the second prediction signal or the combination of the second prediction signal and the second prediction residual, also perform a reduction in spatial pixel sampling resolution on the one of the second prediction signal or the combination of the second prediction signal and the second prediction residual und use the reduction result to acquire the down-mapped offset signal; and
   in mapping the combination of the down-mapped offset signal and the first prediction residual, also perform a spatial up-sampling on the combination of the down-mapped offset signal and the first prediction residual and use the up-sampling result to acquire the up-mapped signal.

16. The video decoding device according to claim 12, wherein the predictor is further configured to
   in mapping a combination of the down-mapped offset signal and the first prediction residual, also perform a spatial up-sampling on the first prediction residual and use the up-sampling result to acquire the up-mapped signal.

17. The video decoding device according to claim 12, wherein the predictor is further configured to
   in a first operating mode,
      in mapping the one of the second prediction signal or the combination of the second prediction signal and the second prediction residual, also perform a reduction in spatial pixel sampling resolution on the one of the second prediction signal or the combination of the second prediction signal and the second prediction residual und use the reduction result to acquire the down-mapped offset signal; and
      in mapping the combination of the down-mapped offset signal and the first prediction residual, also perform a spatial up-sampling on the combination of the down-mapped offset signal and the first prediction residual and use the up-sampling result to acquire the up-mapped signal;
   in a second operating mode,
      in mapping a combination of the down-mapped offset signal and the first prediction residual, also perform a spatial up-sampling on the first prediction residual and use the up-sampling result to acquire the up-mapped signal, and
   wherein the video material is divided into a plurality of blocks and the predictor for temporally predicting is configured to operate block-selectively in the first or the second operating mode depending on an indication within side information of the scalable video signal indicating, for a predetermined block, as to whether the first operating mode or the second operating mode has to be used for the predetermined block.

18. The video decoding device according to claim 12, wherein the predictor is configured to
   map the first prediction residual from a first pixel value bit-depth to a second pixel value bit-depth being higher than the first pixel value bit-depth with scaling the mapped first prediction residual with a scaling factor being dependent on the second prediction signal.

19. The video decoding device according to claim 12, wherein the video material is divided into a plurality of blocks and the scalable video material has coded therein, for a first plurality of blocks, the first prediction residual, and for a second plurality of blocks, a deviation between the second representation and an up-sampled reconstructed version of the first representation, wherein the predictor for temporally predicting and the reconstructor for reconstructing are configured to operate block-selectivity for the first plurality of blocks, and the video decoder further comprises:

a further predictor configured to, for the second plurality of blocks, temporally predict the first representation to acquire a first prediction signal, reconstruct the first representation by use of the first prediction residual and the first prediction signal to acquire a reconstructed version of the first representation, map the reconstructed version of the first representation from the first pixel value resolution to the second pixel value resolution to acquire the up-mapped reconstructed version of the first representation, and reconstruct the second representation by use of the deviation between the second representation and the up-mapped reconstructed version of the first representation and the up-mapped reconstructed version of the first representation.

20. The video decoding device according to claim 19, wherein the further predictor is further configured to in mapping the reconstructed version of the first representation, also perform a spatial up-sampling on the reconstructed version of the first representation and use the up-sampling result to acquire the up-sampled reconstructed version of the first representation.

21. The video decoding device according to claim 20, wherein the further predictor is further configured to block-selectively change an order between the performance of the up-sampling and the mapping according to an indication within side information of the scalable video signal indicating the order to be used.

22. A video decoding device according to claim 12, wherein the predictor is configured to, in mapping the first prediction residual or the reconstructed version of the first prediction residual from the first pixel value resolution to the second pixel value resolution, use an area out of a domain of a non-linear mapping function from a dynamic range associated with the first pixel value resolution as the domain of the non-linear function to the dynamic range associated with the second pixel value resolution as a codomain of the non-linear function, and use the second prediction signal as an estimation of the first prediction signal so as to locate the area so as to obtain the third prediction signal.

23. A method implemented by a computer for encoding a video, comprising:

temporally predicting a first representation of a video material to acquire a first prediction signal, and coding a first prediction residual representing a deviation between the first prediction signal and the first representation, the first representation, the first prediction signal and the first prediction residual being of a first pixel value resolution;

and temporally predicting a second representation of the video material to acquire a second prediction signal, the second representation and the second prediction signal being of a second pixel value resolution being higher than the first pixel value resolution, wherein the temporally predicting involves mapping, dependent on the second prediction signal, the first prediction residual or a reconstructed version of the first prediction residual from the first pixel value resolution to the second pixel value resolution to acquire a third prediction signal and coding a second prediction residual being of the second pixel value resolution and representing a deviation between a combination of the second and third prediction signals and the second representation, wherein temporally predicting the second representation of the video material comprises mapping one of the second prediction signal or a combination of the second prediction signal and the second prediction residual from the second pixel value resolution to the first pixel value resolution to acquire a down-mapped offset signal;

mapping a combination of the down-mapped offset signal and the first prediction residual or the reconstructed version of the first prediction residual from the first pixel value resolution to the second pixel value resolution to acquire an up-mapped signal, and subtracting the one of the second prediction signal or the combination of the second prediction signal and the second prediction residual from the up-mapped signal to acquire the third prediction signal.

24. A method implemented by a computer for decoding a scalable video signal representing a video material with a first and a second pixel value resolution with the second pixel value resolution being higher than the first pixel value resolution, the scalable video signal having coded therein a first prediction residual of the first pixel value resolution and a second prediction residual of the second pixel value resolution, comprising:

reconstructing the first and second prediction residuals from the scalable video signal;

temporally predicting the second representation of the video material to acquire a second prediction signal, the second representation and the second prediction signal being of the second pixel value resolution, wherein the temporally predicting involves mapping, dependent on the second prediction signal, the first prediction residual from the first pixel value resolution to the second pixel value resolution to acquire a third prediction signal;

and reconstructing the second representation based on the second prediction signal, the third prediction signal and the second prediction residual, wherein temporally predicting the second representation of the video material comprises mapping one of the second prediction signal or a combination of the second prediction signal and the second prediction residual from the second pixel value resolution to the first pixel value resolution to acquire a down-mapped offset signal;

mapping a combination of the down-mapped offset signal and the first prediction residual or the reconstructed version of the first prediction residual from the first pixel value resolution to the second pixel value resolution to acquire an up-mapped signal, and subtracting the one of the second prediction signal or the combination of the second prediction signal and the second prediction residual from the up-mapped signal to acquire the third prediction signal.

25. A non-transitory computer-readable medium having stored thereon a computer program comprising instructions for performing, when running on a computer, a method for encoding a video, the method comprising: temporally predicting a first representation of a video material to acquire a first prediction signal, and coding a first prediction residual representing a deviation between the first prediction signal and the first representation, the first representation, the first prediction signal and the first prediction residual being of a first pixel value resolution;

and temporally predicting a second representation of the video material to acquire a second prediction signal, the second representation and the second prediction signal being of a second pixel value resolution being higher than the first pixel value resolution, wherein the temporally predicting involves mapping, dependent on the second prediction signal, the first prediction residual or a reconstructed version of the first prediction residual from the first pixel value resolution to the second pixel value resolution to acquire a third prediction signal and coding a second prediction residual being of the second pixel value resolution and representing a deviation between a combination of the second and third prediction signals and the second representation, wherein temporally predicting the second representation of the video material comprises mapping one of the second prediction signal or a combination of the second prediction signal and the second prediction residual from the second pixel value resolution to the first pixel value resolution to acquire a down-mapped offset signal;

mapping a combination of the down-mapped offset signal and the first prediction residual or the reconstructed version of the first prediction residual from the first pixel value resolution to the second pixel value resolution to acquire an up-mapped signal, and subtracting the one of the second prediction signal or the combination of the second prediction signal and the second prediction residual from the up-mapped signal to acquire the third prediction signal.

26. A non-transitory computer-readable medium having stored thereon a computer program comprising instructions for performing, when running on a computer, a method for decoding a scalable video signal representing a video material with a first and a second pixel value resolution with the second pixel value resolution being higher than the first pixel value resolution, the scalable video signal having coded therein a first prediction residual of the first pixel value resolution and a second prediction residual of the second pixel value resolution, the method comprising:

reconstructing the first and second prediction residuals from the scalable video signal;

temporally predicting the second representation of the video material to acquire a second prediction signal, the second representation and the second prediction signal being of the second pixel value resolution, wherein the temporally predicting involves mapping, dependent on the second prediction signal, the first prediction residual from the first pixel value resolution to the second pixel value resolution to acquire a third prediction signal;

and reconstructing the second representation based on the second prediction signal, the third prediction signal and the second prediction residual, wherein temporally predicting the second representation of the video material comprises mapping one of the second prediction signal or a combination of the second prediction signal and the second prediction residual from the second pixel value resolution to the first pixel value resolution to acquire a down-mapped offset signal;

mapping a combination of the down-mapped offset signal and the first prediction residual or the reconstructed version of the first prediction residual from the first pixel value resolution to the second pixel value resolution to acquire an up-mapped signal, and subtracting the one of the second prediction signal or the combination of the second prediction signal and the second prediction residual from the up-mapped signal to acquire the third prediction signal.

* * * * *